United States Patent
Behling et al.

(10) Patent No.: US 12,411,492 B2
(45) Date of Patent: Sep. 9, 2025

(54) VEHICLE, LOGISTICS SYSTEM AND METHOD FOR TRANSFERRING A LOAD UNIT

(71) Applicant: FRAUNHOFER-GESELLSCHAFT ZUR FORDERUNG DER ANGEWANDTENFORSCHUNG E.V., Munich (DE)

(72) Inventors: Jan Behling, Dortmund (DE); Mathias Rotgeri, Dortmund (DE); Jan Soren Emmerich, Herdecke (DE); Dirk Honing, Bochum (DE); Patrick Klokowski, Castrop-Rauxel (DE); Christian Hammermeister, Dortmund (DE); Michael Ten Hompel, Dortmund (DE)

(73) Assignee: FRAUNHOFER-GESELLSCHAFT ZUR FORDERUNG DER ANGEWANDTENFORSCHUNG E.V, Munich (DE)

( * ) Notice: Subject to any disclaimer, the term of this patent is extended or adjusted under 35 U.S.C. 154(b) by 219 days.

(21) Appl. No.: 18/277,427

(22) PCT Filed: Dec. 14, 2021

(86) PCT No.: PCT/EP2021/085744
§ 371 (c)(1),
(2) Date: Aug. 16, 2023

(87) PCT Pub. No.: WO2022/174956
PCT Pub. Date: Aug. 25, 2022

(65) Prior Publication Data
US 2024/0045431 A1  Feb. 8, 2024

(30) Foreign Application Priority Data
Feb. 16, 2021 (DE) .......................... 102021103623.2

(51) Int. Cl.
*G05D 1/00* (2024.01)
*B60P 1/64* (2006.01)

(52) U.S. Cl.
CPC .......... *G05D 1/0212* (2013.01); *B60P 1/6418* (2013.01); *G05D 1/0225* (2013.01)

(58) Field of Classification Search
CPC ... G05D 1/0212; G05D 1/0225; B60P 1/6418; B60P 1/6427
See application file for complete search history.

(56) References Cited

U.S. PATENT DOCUMENTS 9,580,002 B2 * 2/2017 Jochim ................ B60B 19/003
11,199,853 B1 * 12/2021 Afrouzi ................ B25J 13/006
(Continued)

FOREIGN PATENT DOCUMENTS

| CN | 108176620 A | 6/2018 |
| CN | 110756444 A | 2/2020 |

(Continued)

OTHER PUBLICATIONS

JP Office Action (3 pages).
(Continued)

Primary Examiner — Bhavesh V Amin
(74) Attorney, Agent, or Firm — The Juhasz Law Firm

(57) ABSTRACT

The invention relates to a vehicle (1) for transferring a unit load to a unit load receiving device (100), comprising: a running gear (5), a drive device (30), which drives the running gear on the basis of control commands for adjusting a velocity vector of the vehicle (1) and a vehicle frame (10) with a receiving component (7) for receiving the unit load (L), wherein: the vehicle (1) comprises a vehicle system (S) with a vehicle control function (50), wherein the vehicle control function (50) uses or determines target trajectory follow-up commands as control target specifications, by (Continued)

means of which the vehicle (1) is moved on a vehicle movement path (210, 310) along a target trajectory (ST), wherein the drive device (30) realizes, on the basis of the control commands, a transfer acceleration of the vehicle (1) at least in a portion comprising the target transfer point (211, 311), at which transfer acceleration the unit load (L) on the receiving component of the vehicle is moved onto the unit load receiving device (100) by virtue of the inertia of the unit load. The invention also relates to a logistics system (A) and a method for transferring a unit load (L) from a vehicle (1) to a unit load receiving device (100).

26 Claims, 9 Drawing Sheets

(56) References Cited

U.S. PATENT DOCUMENTS

| | | | | |
|---|---|---|---|---|
| 12,287,642 | B2* | 4/2025 | Behling | G06Q 10/08 |
| 2011/0106362 | A1* | 5/2011 | Seitz | G05D 1/0214 |
| | | | | 701/24 |
| 2019/0230850 | A1* | 8/2019 | Johnson | B65G 67/02 |
| 2020/0002094 | A1* | 1/2020 | Schedlbauer | B65G 1/1375 |
| 2020/0048019 | A1* | 2/2020 | Werner | B65G 17/002 |
| 2020/0122927 | A1* | 4/2020 | Bellar | G06Q 10/087 |
| 2021/0072761 | A1* | 3/2021 | Lee | B60W 10/18 |
| 2021/0073716 | A1* | 3/2021 | Dearing | G06Q 10/083 |
| 2021/0146889 | A1* | 5/2021 | Kuehne | G05D 1/0225 |
| 2021/0171295 | A1* | 6/2021 | Azuma | B65G 67/08 |
| 2021/0214055 | A1* | 7/2021 | Maydanik | E02B 15/046 |
| 2021/0247774 | A1* | 8/2021 | Hotta | G05D 1/0297 |
| 2022/0281375 | A1* | 9/2022 | Behling | B60P 7/0807 |
| 2022/0289478 | A1* | 9/2022 | Moradnia | G05D 1/0293 |
| 2022/0289505 | A1* | 9/2022 | Behling | B65G 67/24 |
| 2023/0159058 | A1* | 5/2023 | Polyakov | B60Q 1/549 |
| | | | | 701/25 |
| 2023/0359222 | A1* | 11/2023 | Behling | G05D 1/0291 |
| 2024/0045431 | A1* | 2/2024 | Behling | B60P 1/6418 |

FOREIGN PATENT DOCUMENTS

| | | |
|---|---|---|
| CN | 110369307 A | 11/2022 |
| DE | 102015114370 B4 | 3/2017 |
| EP | 3608264 A1 | 2/2020 |
| JP | 2019533624 A | 11/2019 |

OTHER PUBLICATIONS

English Translation of JP Office Action (3 pages).
Written Opinion of the International Searching Authority (7 pages).
ISR (2 pages).

* cited by examiner

VEHICLE, LOGISTICS SYSTEM AND METHOD FOR TRANSFERRING A LOAD UNIT

CLAIM TO PRIORITY

This application claims priority to and the benefit of the following pending application PCT/EP2021/085744 having an International filing date of 14 Dec. 2021 (14.12.2021) which claims priority to Priority Application No. DE 10 2021 103 623.2 having a priority date of 16 Feb. 2021 (16 Feb. 2021).

FIELD OF INVENTION

The invention relates to a vehicle, a logistics system and a method for transferring a unit load.

BACKGROUND

Vehicle or logistics system or method according to the invention can be used in particular in the field of sorting systems for charge carriers or unit loads in the form of packets in the region of sorting systems and in particular in a packet center or for unit loads in the form of luggage items of an airport or generally in distribution centers. The unit loads can be delivered to the region of a sorting system in particular by transport vehicles such as trucks, line vehicles or ships or aircraft.

U.S. Pat. No. 3,327,179 A describes a vehicle with a trailer for charging a charge. The charge is moved onto a conveyor belt by pushing the trailer on a roadway section with a gradient and by moving the trailer onto a bollard besides the roadway section.

The publication DE 102019 122 055 A1 describes a vehicle with a charge hold. For the delivery of cargo, which is located on the surface of the cargo hold, to a charge takeover station the coefficient of friction of the surface of the cargo hold can be reduced.

A transport system with a transport device is known from WO 2008/148513 A1.

The object of the invention is to provide a vehicle and a method, by means of which unit loads located on the vehicle can be moved in an efficient manner to a unit load receiving device.

These objects are achieved with the features of the independent claims. Further embodiments of the invention are specified in the dependent claims referred to in each case.

SUMMARY

The term "unit loads" herein generally refers to a charge carrier or containers can be understood in which material to be transported in each case, such as piece goods or also liquids or gas, are contained or are not contained. Unit loads can also be packages or, in particular, closed containers which are open on an upper side in the direction of gravity.

The expression "along" herein means in connection with a directional indication referred to herein, which in particular also corresponds to the course of a contour line or a surface or a direction of a component or a structural component such as an axis or a shaft or a central axis thereof, with respect to a reference direction or a reference axis, that a portion of the course or the tangent to a respective contour line or respective surface or the direction in an explicitly or implicitly predefined viewing direction deviates locally or in a section at an angle of a maximum of 45 degrees and in particular of a maximum of 30 degrees from the respective reference direction or reference axis, to which the respective directional indication is related.

The expression "transverse" herein means in connection with a directional indication referred to herein, which in particular also corresponds to the course of a contour line or a surface or a direction of a component or a structural component such as an axis or a shaft or a central axis thereof, with respect to a reference direction or a reference axis, that a portion of the course or the tangent to a respective contour line or respective surface or the direction in an explicitly or implicitly predetermined viewing direction deviates locally or in a section at an angle which is between 45 degrees and 135 degrees, and preferably at an angle which is between 67 degrees and 113 degrees from the respective reference direction or reference axis, to which the respective directional indication is related.

The term "movement direction reversal" with respect to a reversal point of a trajectory of a vehicle means herein a vehicle movement along a trajectory in which the tangent at this reversal point to the trajectory section which guides to this reversal point, runs along the tangent in the same reversal point to a trajectory section which guides from this reversal point.

The term "distance" in particular between two surfaces is understood here in particular as the shortest distance.

More specifically, herein, a "distance" may be between two objects or two surfaces or reference points, in particular the shortest distance or the shortest distance between the two objects or surfaces or reference points wherein the shortest distance or the shortest distance is not equal to zero, unless explicitly stated herein in this respect.

A "longitudinal direction" or another reference direction of a reference line, such as in particular a central axis or a centrally extending line or a center line of at least one structural component or a component and in particular of a guide path is herein, in particular, a connection line of the centers of gravity of the respectively smallest cross-sectional areas of the respective structural component along a determined or predetermined direction or between two determined or predetermined ends. In the case that the reference line can run in a curved or at least partially curved manner, the reference direction can generally be understood as a local longitudinal direction. However, the reference direction herein can also be understood as the direction of a reference line, which is defined as straight-line, wherein, in order to determine the straight reference line, a line is used the direction of which relative to the curved line in the sum results in the smallest deviation between these lines or the smallest deviation area. The same applies, if a straight reference line is to be derived from a curved line herein.

In particular, the term "substantially" with respect to a feature or value is understood herein to mean that the feature has a deviation of 20% and specifically of 10% from the feature or its geometric property or of the value.

"Orientation" with respect to a surface and in particular surface is understood herein to mean the normal to the respective surface. In the event that the surface concerned is not a straight but, for example, a curved surface, in order to determine the surface normals, the normal can be used on a straight surface of the same size, for the position of which the smallest deviation results in the sum relative to the curved surface.

An "extension" of a surface portion is understood to mean a direction of a planar surface portion which runs along the surface portion which is referred to and has such a position with respect thereto in which the sum of the deviation amounts between the two surface sections is minimal. With respect to a length amount of the extent of a surface portion is understood herein as a length of a fictitious surface portion of the same size in a direction to be defined which has a position relative to the referenced surface portion in which the sum of the deviation amounts between the two surface sections is minimal.

The term "continuous" or "continuously connecting", in particular with respect to a surface or a structural component extending in at least one longitudinal direction, such as a skin, a plate or wall, it will be understood herein that the surface or structural component extends without interruption.

By a "continuous course" of a line or edge or surface is meant that the surface does not have a corner, as seen along a reference direction, over the entire width extending transversely to the reference direction, i.e. it comprises a differentiable course. By a "curved course" of a line or edge or surface is meant that the surface does not have a corner, as seen along a reference direction, over the entire width extending transversely to the reference direction, i.e. has a differentiable profile.

A "uniformly curved profile" is understood herein to mean a curvature without a turning point.

The term "operation area" is understood herein to mean a range of movement of the vehicles or devices described herein when they are moved or move as intended. The operation area provides, in particular, a surface which is an operation surface or driving support for the vehicle according to the invention. The operation surface or contact support is a surface which extends, for example, in a planar manner. In this case, the operation surface can have a continuous course. Alternatively or additionally, the operation surface may have steps, small ramps, thresholds. The operation surface can also be formed from floors of a plurality of halls.

The vehicle according to the invention is provided in particular for carrying out driving movements on an operation surface of an operation area. The operation surface is formed as a contact support for the vehicle. The operation surface may be a continuous surface, or a discontinuous surface, such as a grid, wherein the operation surface forms a surface that extends planar. In this case, the surface may also have steps and shapes such as ramps or steps or channels.

The term "position" of a point such as a reference point or a body is referred to herein as the position of the point as the reference point or the body defined in surface coordinates/spatial coordinates and, in particular, in the three spatial coordinates. In the case of a position of a body, in particular the position of a center or center point and in particular the center of gravity of the body is understood here.

The vehicle according to the invention is in particular a self-controlling vehicle, that is to say it can perform predetermined tasks without manual control, thus the driving movements of the vehicle designed for task fulfillment are executed automatically that is to say without manual intervention.

The term "vehicle state" herein refers to a state of the vehicle defined by one or more of the following: a position, a velocity, and a current orientation of the vehicle in particular a longitudinal axis of the vehicle. Vehicle state can be, in particular, a vehicle target state or a vehicle actual state of the vehicle, which is a temporally current vehicle state.

The combination of a velocity and a (travel) direction of a vehicle can be defined by a velocity vector of the vehicle, since this vector indicates the magnitude of the velocity and the (travel) direction of the vehicle. Velocity vector is understood herein to mean a combination of data indicating the velocity and the (travel) direction of the vehicle. The velocity vector may also define the state at which the vehicle is not moved, i.e., the magnitude of the velocity is equal to zero.

The term "orientation" of a vehicle is understood to mean a direction of a defined or predetermined longitudinal axis of the vehicle. The longitudinal axis may in particular be a center line or center axis of the vehicle. The orientation of the vehicle is in particular a direction which can be stored as a reference in the control function. The orientation of a vehicle can in particular coincide with the direction of travel of the vehicle which has the vehicle at a neutral position of the running gear or the wheels of the running gear and in particular a neutral position of the running gear or of the wheels of the running gear set by a steering device.

The position and the velocity of the vehicle may in particular be related to a predetermined reference point of the vehicle.

"Self-controlling" is understood herein with reference to a vehicle in particular to mean that the vehicle fulfills a transfer mission task on the basis of target specifications to a control function and control commands determined therefrom or control commands to a drive device of the vehicle for controlling the vehicle for a movement thereof along a trajectory. In this case, the transfer mission task includes in particular transporting a unit load conveyed or carried by a vehicle by moving the vehicle along a trajectory on the basis of control commands or adjustment commands transmitted to the drive device connected to the drive device transmitted control commands or control commands and the transfer or movement of the unit load from the vehicle to or on the unit load receiving device.

"Trajectory" is understood herein to mean a course of a path that a vehicle has traveled or is intended to travel due to a mission task. The trajectory and in particular a target trajectory can be defined as a mathematical function or as a series of discrete points or as a combination of a mathematical function and a series of discrete points.

A "target speed profile" is used herein to describe a predefined or determined row or a profile of target velocities along a trajectory and in particular a target trajectory and in the transfer region of the target trajectory or in a section of these trajectories. The target velocities can be constant or variable along the respective trajectory. The target acceleration is also defined at a point of the target trajectory at a target velocity.

Herein, "transfer acceleration" of the vehicle at the respective point in time is understood to mean an current transfer acceleration which is to be achieved in particular in order that, in the event of a course of the transfer region of the target trajectory or current trajectory, the unit load located on a receiving component of the vehicle is transferred by its mass inertia from the receiving component to the unit load receiving device.

The term "function" is understood herein to mean a functional relationship or an algorithm which is stored in a relevant device. For example, the target trajectory determination function can be realized by an algorithm which is realized in the vehicle system or the logistics central device.

The control commands are determined or generated at discrete points in time by the vehicle control function. For this purpose, the vehicle system can have a clock generator which determines or generates the control commands at predetermined times in a predetermined iteration rate and transmits it to the drive device.

Vehicle according to the invention is provided for transferring a unit load to a unit load receiving device in an operation area.

According to an embodiment of the vehicle according to the invention for transferring a unit load to a unit load receiving device in an operation area, it is provided that the vehicle has: a running gear, a drive device which is connected to the running gear and drives the running gear on the basis of control commands for adjusting a velocity vector of the vehicle, and a vehicle frame arranged on the running gear and having a receiving component for receiving the unit load, wherein the vehicle comprises a vehicle system with a vehicle control function, wherein the vehicle control function uses or determines target trajectory follow-up commands as control target specifications with which the vehicle is moved on a vehicle movement path along a target trajectory, wherein the target trajectory runs between an initial point and an end point and comprises a transfer region with a target transfer point associated with the unit load receiving device, wherein the vehicle control function uses or determines, at least for the transfer region of the target trajectory, a target speed profile as control target specification, wherein the vehicle control function comprises a drive control function which converts the control target specifications into control commands which define a respective current target velocity vector with respect to the respective actual vehicle state, wherein the drive device, on the basis of the control commands, realizes a transfer acceleration of the vehicle at least in a section comprising the target transfer point in which the unit load located on the receiving component of the vehicle is moved by its mass inertia onto the unit load receiving device.

According to an embodiment of the vehicle according to the invention for transporting and transferring a unit load to a unit load receiving device in an operation area, said vehicle comprises: a running gear, a drive device which is connected to the running gear and drives the running gear on the basis of control commands for adjustment of a velocity vector of the vehicle, and a vehicle frame arranged on the running gear and comprising a receiving component for receiving the unit load, wherein the vehicle comprises a vehicle system with: a vehicle control function, which is functionally connected to the drive device and determines control commands on the basis of control target specifications and transmits said commands to the drive device in order to adjust a respective current velocity vector of the vehicle, wherein the vehicle control function transmits target trajectory follow-up commands as control commands to the drive device with which the vehicle is moved along a target trajectory on a vehicle movement path, wherein the target trajectory runs between an initial point and an end point and comprises a transfer region with a target transfer point assigned to the unit load receiving device, wherein the vehicle control function transmits velocity commands as control commands to the drive device which sets a transfer velocity of the vehicle in the target transfer point on the basis of the control target specifications, wherein the shape of the transfer region, the position of the transfer point relative to the unit load receiving device and the transfer velocity are set in such a way that the unit load located on the receiving component of the vehicle is moved by its mass inertia onto the unit load receiving device.

The embodiments of the vehicle according to the invention, in combination with otherwise, any variant or embodiment of the vehicle described or contained herein, may provide that the vehicle control function comprises: a target trajectory follow-up function which, when the vehicle is moved, puts current vehicle actual states at least with a vehicle actual position relative to a target trajectory into a deviation relation and determines target trajectory follow-up commands from the deviation relation and transmits them as control commands to the drive control function, by which the vehicle is moved on a vehicle movement path along the target trajectory, wherein the target trajectory runs between an initial point and an end point and comprises a transfer region with a target transfer point assigned to the unit load receiving device, a unit load transfer control function, which determines velocity commands on the basis of a target speed profile of the vehicle and transmits them as control commands to the drive device which adjusts a transfer velocity of the vehicle in the target transfer point, wherein the shape of the transfer region, the position of the transfer point relative to the unit load receiving device and the transfer velocity are set in such a way that the unit load located on the receiving component of the vehicle is moved by its mass inertia onto the unit load receiving device.

According to one embodiment of the vehicle according to the invention, the vehicle comprises: a running gear, a drive device, which is connected to the running gear and drives the running gear such that it adjusts a velocity vector of the vehicle on an operation surface of the operation area, and a vehicle frame arranged on the running gear with a receiving component for receiving a unit load. The vehicle comprises, in particular, a vehicle system which comprises: a vehicle control function, which is functionally connected to the drive device and determines control commands on the basis of control target specifications and transmits said commands to the drive device to adjust a respective current velocity vector of the vehicle, wherein the vehicle control function comprises: a target trajectory follow-up function, which, when the vehicle is moved, puts current vehicle actual states at least and a vehicle actual position relative to a target trajectory into a deviation relation and which determines target trajectory follow-up commands from the deviation relation and transmits the same as control commands to the drive device with which the vehicle is moved along the target trajectory on a vehicle movement path, wherein the target trajectory runs between an initial point and an end point and comprises a transfer region with a target transfer point assigned to the unit load receiving device, a load transfer control function, which determines velocity commands on the basis of a target speed profile of the vehicle and transmits them as control commands to the drive device in order to set a transfer velocity of the vehicle in the target transfer point, so that the unit load located on the receiving component of the vehicle is moved by its mass inertia onto the unit load receiving device.

The embodiments of the vehicle according to the invention, in combination with otherwise any variant or embodiment of the vehicle described or contained herein, provide that the target trajectory in the vehicle system or in the vehicle control function and in this case in particular in the target trajectory follow-up function, for example is present and stored as a predetermined target trajectory, or is received from the vehicle system from the outside, i.e. from a device outside the vehicle, and is provided to the vehicle control function.

The embodiments of the vehicle according to the invention, in combination with otherwise any variant or embodiment of the vehicle described or contained herein, may provide that the vehicle control function (50) comprises a target trajectory follow-up function (60) which, when the vehicle is moved, puts current vehicle actual states and at least a vehicle actual position relative to a target trajectory in each case in a deviation relation and, from the deviation relation, determines target trajectory follow-up commands and transmits as control commands to the drive control function (55).

The embodiments of the vehicle according to the invention, in combination with otherwise any variant or embodiment of the vehicle described or contained herein, may provide that a target speed profile is predefined in the load transfer control function. In this case, it can in particular be provided that a target speed profile with a target acceleration is preset.

The embodiments of the vehicle according to the invention, in combination with otherwise any variant or embodiment of the vehicle described or contained herein, may provide that the vehicle control function comprises a load transfer control function which determines velocity commands on the basis of a target speed profile of the vehicle and transmits the same as control commands to the drive control function which adjusts a transfer velocity of the vehicle in the target transfer point, wherein the shape of the transfer region, the position of the transfer point relative to the unit load receiving device and the transfer velocity are set in such a way that the unit load (L) located on the receiving component of the vehicle is moved by its mass inertia onto the unit load receiving device.

In each of the embodiments of the invention with a load transfer control function, it may be provided that the load transfer control function defines a target velocity of the vehicle in the target transfer point.

Furthermore, in each of the embodiments of the invention with a load transfer control function, it can be provided that the load transfer control function defines a target acceleration of the vehicle in the transfer region.

The embodiments of the vehicle according to the invention, in combination with otherwise any variant or embodiment of the vehicle described or contained herein, may provide that the vehicle system comprises a velocity determination function which determines the transfer velocity on the basis of at least one speed profile criterion.

The embodiments of the vehicle according to the invention, in combination with otherwise any variant or embodiment of the vehicle described or contained herein, may provide that the velocity determination function determines the target speed profile on the basis of one or both of the profiles (ST1), (ST2) of the transfer region:
(ST1) the transfer area guides the vehicle past the unit load receiving device and comprises a curvature section with substantially uniform curvature so that the vehicle experiences a lateral acceleration wherein the unit load receiving device is located on the convex side thereof;
(ST2) the transfer region guides the vehicle to an impact against the unit load receiving device in the target transfer point with a movement direction reversal in this target transfer point, wherein the portion of the transfer region which guides to the target transfer point can have a direction in the target transfer point relative to the extent of a stop surface of the unit load receiving device, which is situated in an angular range, which is greater than 25 degrees in absolute terms.

In these embodiments, it may in particular be provided that the velocity determination function uses a property value of the unit load. A property value of the unit load can in particular be the weight or the friction behavior of the unit load on the receiving component or on a receiving surface of the receiving component.

The embodiments of the vehicle according to the invention, in combination with otherwise any variant or embodiment of the vehicle described or contained herein, may provide that the vehicle comprises a weight sensor device, by means of which the weight of a unit load located on the receiving component can be determined and assigns a weight value to the determined weight, and transmits the weight value as a property value of the unit load to the velocity determination function.

The embodiments of the vehicle according to the invention, in combination with otherwise any variant or embodiment of the vehicle described or contained herein, may provide that the vehicle control function adjusts or adapts the target velocity or a target acceleration or the distance between the target transfer point and an edge region of the unit load receiving device operation surface facing the operation surface, from at least one property value of the unit load.

In the embodiments of the vehicle according to the invention, a speed profile criterion can be an acceleration value of the vehicle.

The embodiments of the vehicle according to the invention with a velocity-determining function, the same may determine a value for the target acceleration in the transfer point (211, 311) and, from this, the target speed profile with the target velocity or target acceleration on the basis of at least one speed profile criterion.

The embodiments of the vehicle according to the invention, in combination with otherwise any variant or embodiment of the vehicle described or contained herein, may be realized such that the speed profile criterion is a minimum energy requirement or minimal consumption when driving off the target trajectory.

The embodiments of the vehicle according to the invention, in combination with otherwise any variant or embodiment of the vehicle described or contained herein, may be realized such that the target trajectory is stored in the vehicle control function as a predefined target trajectory, and the vehicle control function provides the target trajectory of the target trajectory follow-up function.

The embodiments of the vehicle according to the invention, in combination with otherwise any variant or embodiment of the vehicle described or contained herein, may be realized such that the vehicle control function comprises a target trajectory determination function which determines the target trajectory and that the vehicle control function provides the target trajectory of the target trajectory follow-up function.

The embodiments of the vehicle according to the invention with a target trajectory determination function, in combination with otherwise each variant or embodiment of the vehicle described or contained herein, can be realized such that the target trajectory determination function determines the target trajectory on the basis of at least one trajectory course criterion.

The embodiments of the vehicle according to the invention with a target trajectory determination function, in combination with otherwise each variant or embodiment of the vehicle described or contained herein may be realized such that the target trajectory determination function has stored a plurality of target trajectories, one of which is determined by the target trajectory determination function on the basis of at least one trajectory course criterion by selecting one of the trajectories.

The embodiments of the vehicle according to the invention with a target trajectory determination function, in combination with otherwise each variant or embodiment of the vehicle described or contained herein may be realized such that the target trajectory determination function has stored at least one target trajectory and the target trajectory determination function adapts parameters of the target trajectory on the basis of at least one trajectory course criterion.

The embodiments of the vehicle according to the invention with a target trajectory stored in the vehicle system or the vehicle control function, in combination with otherwise any variant or embodiment of the vehicle described or contained herein, may be realized such that target trajectories are defined according to one of the two following alternatives (ST1), (ST2):
- (ST1) the transfer area guides the vehicle past the unit load receiving device and comprises a curvature section with uniform curvature so that the vehicle experiences lateral acceleration, wherein the unit load receiving device is located on the convex side thereof,
- (ST2) the transfer region guides the vehicle to an impact against the unit load receiving device in the target transfer point with a movement direction reversal in this target transfer point, wherein the section of the transfer region which leads to the target transfer point may have a direction in the target transfer point which is situated in an angular range relative to the extension of a stop surface of the unit load receiving device which is greater than 25 degrees in absolute terms.

The embodiments of the vehicle according to the invention with a target trajectory determination function, in combination with otherwise each variant or embodiment of the vehicle described or contained herein may be realized such that the target trajectory determination function in the case of a target speed profile in the transfer region defined as a control target specification and/or in the case of a target acceleration in the target transfer point of the vehicle defined as a control target specification, one or more of the following trajectory course criteria (TK1), (TK2), (TK3), (TK4), (TK5), (TK6) are used in order to ensure the transfer acceleration of the vehicle 1 to be achieved:
- (TK1) minimum length from the vehicle actual position or the initial point of the target trajectory to the target transfer point,
- (TK2) minimum transfer velocity, (TK3) minimum time duration from the vehicle actual position or the initial point of the target trajectory to the target transfer point,
- (TK4) minimal energy demand or minimum energy consumption for driving the vehicle from the vehicle actual position or the initial point of the target trajectory to the target transfer point,
- (TK5) reliable/process-safe transfer or no malfunction of the unit load L from the vehicle 1 to the unit load receiving device (100),
- (TK6) minimal utilization of space in the unit load receiving device (100).

The embodiments of the vehicle according to the invention, in combination with otherwise any variant or embodiment of the vehicle described or contained herein, may be realized such that the target trajectory is formed from a load transfer trajectory and a coupling trajectory adjoining the latter, wherein the load transfer trajectory runs between an initial point and a target transfer point assigned to the unit load receiving device and wherein the coupling trajectory leads to the coupling point and connects the current vehicle actual position to the coupling point, wherein the target trajectory follow-up function comprises the following functions:
- (i) a coupling trajectory follow-up function, which, when the vehicle is moved, puts current actual vehicle positions and the coupling trajectory into a deviation relation and determines coupling trajectory control commands from the deviation relation and transmits the same to the drive device such that the vehicle is moved on a vehicle trajectory along the coupling trajectory,
- (ii) a load transfer trajectory follow-up function which, after the vehicle has reached the load transfer trajectory, puts current vehicle actual positions and the load transfer trajectory in a deviation relation and determines from the deviation relation load transfer trajectory control commands and transmits the same to the drive device so that the vehicle is moved on a vehicle trajectory along the load transfer trajectory.

The embodiments of the vehicle according to the invention with a target trajectory determination function, in combination with otherwise each variant or embodiment of the vehicle described or contained herein, may be realized such that the vehicle system comprises a vehicle communication device which is in data or signal connection with a logistics central device, which is arranged in a stationary manner in the operation area, and which receives control target specifications from the logistics central device and transmits the same to the vehicle control function.

The embodiments of the vehicle according to the invention with a target trajectory determination function, in combination with otherwise each variant or embodiment of the vehicle described or contained herein, may be realized such that the vehicle system comprises a vehicle communication device, which can be brought into radio connection with a logistics central device that is stationary in the operation area and which receives from the same data which define a vehicle current state at least with a vehicle current position and which transmits the same to the vehicle control function.

The embodiments of the vehicle according to the invention with a target trajectory determination function, in combination with otherwise each variant or embodiment of the vehicle described or contained herein, may be realized such that the vehicle system comprises a sensor device that detects current vehicle actual positions, wherein the sensor device is functionally connected to the vehicle control function and transmits the current vehicle actual positions to the vehicle control function.

Each of the embodiments of the vehicle according to the invention with a sensor device for detecting current vehicle actual positions, may be realized such that the sensor device comprises an optical sensor or a camera which respectively images optical floor features or floor markings of the operation surface that can be captured by the optical sensor and, for example, are visible, wherein the vehicle system comprises an identification function optionally with a corresponding assignment function, with which the vehicle actual position is determined on the basis of a current image of ground markings which are arranged on the operation surface.

According to a further aspect of the invention, a logistics system is provided, which in particular comprises:
- a logistics central device which is arranged in a stationary manner in an operation area and comprises a logistics communication device, a unit load receiving device arranged in the operation area, a vehicle for transferring a unit load to the unit load receiving device, the vehicle which comprising: a running gear, a drive device, which is in communication with the running gear and which adjusts a velocity vector of the vehicle on an operation surface of the operation area, and a vehicle frame which is arranged on the running gear and comprises a receiving component for receiving the unit load, wherein the vehicle comprises a vehicle system which comprises:

a vehicle control function which is functionally connected to the drive device and which determines control commands on the basis of control target specifications and transmits said commands to the drive device for adjusting a respective current velocity vector of the vehicle, a vehicle communication device which is in data or signal connection with the logistics communication device via radio and is functionally connected to the vehicle control function, wherein the vehicle control function uses or determines target trajectory follow-up commands as control target specifications with which the vehicle is moved along a target trajectory on a vehicle movement path, wherein the target trajectory runs between an initial point and an end point and comprises a transfer region with a target transfer point assigned to the unit load receiving device, wherein the vehicle control function uses or determines a target speed profile as control target specification at least for the transfer region of the target trajectory, wherein the vehicle control function comprises a drive control function which converts the control target specifications into control commands which define a respective current target velocity vector with respect to the respective current vehicle state, wherein the drive device, on the basis of the control commands, realizes a transfer acceleration of the vehicle at least in a section comprising the target transfer point in which transfer acceleration the unit load located on the receiving component of the vehicle is moved by its mass inertia onto the unit load receiving device, Each of the embodiments of the logistics system according to the invention may be realized such that the vehicle control function comprises the target trajectory follow-up function and a load transfer control function.

Each of the embodiments of the logistics system according to the invention may be realized such that the target trajectory follow-up function contains the target trajectory.

Each of the embodiments of the logistics system according to the invention may be realized such that the vehicle is designed according to one of the variants or embodiments described or contained herein.

Each of the embodiments of the logistics system according to the invention may be realized such that the logistics central device comprises a vehicle identification device for determination of respective current vehicle actual positions, wherein the vehicle identification device is functionally connected to the logistics communication device and transmits the determined respective current vehicle actual positions to the logistics communication device, wherein the logistics communication device is connected to the vehicle communication device via a radio connection and transmits the respective current vehicle actual positions to the vehicle communication device, that the vehicle control function is operatively connected to the vehicle communication device and receives the current actual vehicle positions, respectively, that the vehicle control function comprises a target trajectory follow-up function which, on the basis of the received respective current vehicle actual positions and on the basis of the target trajectory, determines target trajectory follow-up commands and transmits control commands to the drive device, that the vehicle control function comprises a load transfer control function which generates velocity commands on the basis of a target speed profile of the vehicle and transmits the velocity commands as control commands to the drive device.

Each of the embodiments of the logistics system according to the invention with a vehicle identification device may be realized such that the load transfer control function contains the target speed profile and the velocity commands are generated therefrom.

Each of the embodiments of the logistics system according to the invention with a vehicle identification device may be realized such that the logistics central device comprises:

a centrally arranged logistics identification device for determining in each case current vehicle actual positions, which comprises: the target trajectory follow-up function with the target trajectory which, on the basis of the current vehicle actual positions and the target trajectory, determines target trajectory follow-up commands and transmits the same as control target specifications to the logistics communication device, which transmits the target trajectory follow-up commands to the vehicle communication device as control target specifications, a centrally arranged load transfer control function that generates velocity commands and transmits the same as control target specifications to the logistics communication device which determines the velocity commands and transmits the same as control target specifications to the vehicle communication device, wherein the vehicle communication device transmits the target trajectory follow-up commands as control target specifications to the vehicle control function which transmits the target trajectory follow-up commands and the velocity commands to the drive device.

Each of the embodiments of the logistics system according to the invention with a vehicle identification device may be realized such that the logistics central device comprises: a logistics identification device for determining in each case current vehicle actual positions, a central target trajectory follow-up function which, on the basis of the current vehicle actual positions and the target trajectory, determines target trajectory follow-up commands and transmits them as control target specifications to the logistics communication device which transmits the target trajectory follow-up commands to the vehicle communication device, wherein the vehicle communication device transmits the target trajectory follow-up commands as control commands to the drive device, that the vehicle control function comprises: the load transfer control function that generates velocity commands based on a target speed profile of the vehicle and acts as control commands to the drive device.

Each of the embodiments of the logistics system according to the invention with a vehicle identification device and a centrally arranged target trajectory follow-up function may be realized such that the logistics central device comprises a logistics control function in which the target trajectory is stored as a predefined target trajectory and the logistics communication device transmits the target trajectory to the target trajectory follow-up function. In these embodiments of the logistics system according to the invention, it can be provided that the vehicle control function comprises a target trajectory determination function which determines the target trajectory and the vehicle control function provides the target trajectory of the target trajectory follow-up function.

According to a further aspect of the invention, a method for transferring a unit load from a vehicle to a unit load receiving device in an operation area, the vehicle comprising: a running gear, a drive device which is connected to the running gear and which, on the basis of control commands, adjusts a velocity vector of the vehicle on an operation surface of the operation area, and a vehicle frame arranged on the running gear and comprising a receiving component for receiving a unit load, wherein the method comprises the following steps:
- based on control target specifications, determination of control commands and transmission thereof to the drive device in order to adjust a respective current velocity vector of the vehicle, upon movement of the vehicle with a respective velocity vector, determining a deviation relation between respective current vehicle actual states at least with a respective current vehicle actual position relative to a target trajectory, wherein the target trajectory runs between an initial point and an end point and comprises a transfer region with a target transfer point associated with the unit load receiving device, from the deviation relation determining target trajectory follow-up commands and transmission of the same as control commands to the drive device, wherein by means of the control commands the vehicle is moved on a vehicle movement path along the target trajectory, based on a target speed profile of the vehicle, determining velocity commands and transmitting the same as control commands to the drive device, wherein the velocity commands adjust a transfer acceleration of the vehicle in the target transfer point and wherein the unit load which is located on the receiving component of the vehicle is moved by the mass inertia thereof to the unit load receiving device.

Each of the embodiments of the method according to the invention of the logistics system may be realized such that a speed profile for the vehicle is predefined when driving along the target trajectory.

The embodiments of the vehicle according to the invention, in combination with otherwise any variant or embodiment of the vehicle described or contained herein may be realized such that the transfer acceleration is determined on the basis of one or both of the profiles (ST1), (ST2) of the transfer region:
- (ST1) the transfer area guides the vehicle past the unit load receiving device and comprises a curvature section with uniform curvature so that the vehicle experiences lateral acceleration, wherein the unit load receiving device is located on the convex side thereof,
- (ST2) the transfer region guides the vehicle to an impact against the unit load receiving device in the target transfer point with a movement direction reversal in this target transfer point, wherein the section of the transfer region which leads to the target transfer point may have a direction in the target transfer point which is situated in an angular range relative to the extension of a stop surface of the unit load receiving device which is greater than 25 degrees in absolute terms.

The embodiments of the method according to the invention in combination with otherwise any variant or embodiment of the vehicle described or contained herein may be realized such that the velocity determination function uses a property value of the unit load. In this case, the weight of the unit load or a coefficient of friction in relation to a movement of the unit load can be used as the property value of the unit load on the receiving component or the receiving surface of the vehicle for receiving a unit load or a combination of the weight and the coefficient of friction.

The embodiments of the method according to the invention in combination with otherwise any variant or embodiment of the vehicle described or contained herein may be realized such that, by means of a weight sensor device of the vehicle, the weight of a unit load located on the receiving component is determined and a weight value is assigned to the determined weight and this weight value is used for determining the velocity as a property value of the unit load, wherein the transfer velocity is determined in particular with the weight.

Each of the embodiments of the method according to the invention may be realized such that an acceleration value of the vehicle is a speed profile criterion.

Each of the embodiments of the method according to the invention may be realized such that the velocity determination function determines and uses a value for the target acceleration in the transfer point speed profile is determined.

The embodiments of the method according to the invention in combination with otherwise any variant or embodiment of the vehicle described or contained herein may be realized such that the speed profile criterion is a minimum energy requirement or minimal consumption when driving off the target trajectory.

The embodiments of the method according to the invention in combination with otherwise any variant or embodiment of the vehicle described or contained herein may be realized such that the target trajectory is a predefined target trajectory.

The embodiments of the method according to the invention in combination with otherwise any variant or embodiment of the vehicle described or contained herein may be realized such that the vehicle control function comprises a target trajectory determination function which determines the target trajectory and the vehicle control function provides the target trajectory to the target trajectory follow-up function.

Each of the embodiments of the method according to the invention with a target trajectory determination function may be realized such that the target trajectory determination function determines the target trajectory on the basis of at least one trajectory course criterion.

Each of the embodiments of the method according to the invention with a target trajectory determination function may be realized such that the target trajectory is determined on the basis of at least one trajectory course criterion by selecting one of the target trajectories.

Each of the embodiments of the method according to the invention with a target trajectory determination function may be realized such that parameters of the target trajectory are adapted on the basis of at least one trajectory course criterion.

Each of the embodiments of the method according to the invention with a target trajectory determination function may be realized such that target trajectories are defined according to one of the two following alternatives (ST1), (ST2):
- (ST1) the transfer area guides the vehicle past the unit load receiving device and comprises a curvature section with uniform curvature so that the vehicle experiences lateral acceleration, wherein the unit load receiving device is located on the convex side thereof, (ST2) the transfer region guides the vehicle to an impact against the unit load receiving device in the target transfer point with a movement direction reversal in this target transfer point, wherein the section of the transfer region which leads to the target transfer point may have a direction in the target transfer point which is situated in an angular range relative to the extension of a stop surface of the unit load receiving device which is greater than 25 degrees in absolute terms.

Each of the embodiments of the method according to the invention with a target trajectory determination function may be realized such that the target trajectory determination function, that the target trajectory determination function in the case of a target speed profile in the transfer region defined as a control target specification and/or in the case of a target acceleration in the target transfer point of the vehicle defined as a control target specification, one or more of the following trajectory course criteria (TK1), (TK2), (TK3), (TK4), (TK5), (TK6) are used in order to ensure the transfer acceleration of the vehicle 1 to be achieved:
(TK1) minimum length from the vehicle actual position or the initial point of the target trajectory to the target transfer point,
(TK2) minimum transfer velocity, (TK3) minimum time duration from the vehicle actual position or the initial point of the target trajectory to the target transfer point,
(TK4) minimal energy demand or minimum energy consumption for driving the vehicle from the vehicle actual position or the initial point of the target trajectory to the target transfer point,
(TK5) reliable/process-safe transfer or no malfunction of the unit load from the vehicle to the unit load receiving device,
(TK6) minimal utilization of space in the unit load receiving device.

The embodiments of the method according to the invention in combination with otherwise any variant or embodiment of the vehicle described or contained herein may be realized such that the target trajectory is formed from a load transfer trajectory and a coupling trajectory connected thereto, wherein the load transfer trajectory runs between an initial point and a target transfer point associated with the unit load receiving device, and the coupling trajectory guides to the coupling point and connects the current vehicle actual position to the coupling point, wherein the target trajectory follow-up commands are determined with the following functions:
(i) a coupling trajectory follow-up function, which, when the vehicle is moved, puts current actual vehicle positions and the coupling trajectory into a deviation relation and determines coupling trajectory control commands from the deviation relation and transmits the same to the drive device such that the vehicle is moved on a vehicle trajectory along the coupling trajectory,
(ii) a load transfer trajectory follow-up function which, after the vehicle has reached the load transfer trajectory, puts current vehicle actual positions and the load transfer trajectory in a deviation relation and determines from the deviation relation load transfer trajectory control commands and transmits the same to the drive device so that the vehicle is moved on a vehicle trajectory along the load transfer trajectory.

The embodiments of the method according to the invention in combination with otherwise any variant or embodiment of the vehicle described or contained herein may be realized such that the vehicle system of the vehicle is in data or signal connection via radio in a logistics central device arranged in a stationary manner in the operation area and receives control target specifications from the logistics central device and transmits the same to the vehicle control function.

The embodiments of the method according to the invention, in combination with otherwise any variant or embodiment of the vehicle described or contained herein, may be realized such that the vehicle system receives data defining a vehicle-actual state at least with a vehicle-actual position from a logistics central device stationary in the operation area, that the vehicle system determines the velocity commands from the deviation relation and the velocity commands on the basis on a target speed profile of the vehicle and transmits the same as control commands to the drive device.

The embodiments of the method according to the invention in combination with otherwise any variant or embodiment of the vehicle described or contained herein may be realized such the current vehicle actual positions are captured by means of a sensor device of the vehicle system.

Each of the embodiments of the method according to the invention with the sensor device of the vehicle system may be realized such that the sensor device comprises a camera which respectively images optical floor features or floor markings of the operation surface that can be captured by the optical sensor, wherein the vehicle system comprises an identification function with which the vehicle actual position is determined on the basis of a current mapping of ground features or floor markings which are arranged on the operation surface.

DESCRIPTION OF DRAWINGS

In the following, embodiments of the invention will be described with reference to the accompanying figures. Herein, the description of features or components of embodiments according to the invention is to be understood as such that a specific embodiment according to the invention, provided that this is not explicitly excluded, can also comprise at least one feature of another embodiment, each as an additional feature of this particular embodiment, or as an alternative feature that replaces another feature of this particular embodiment. The figures show.

Figure 1:
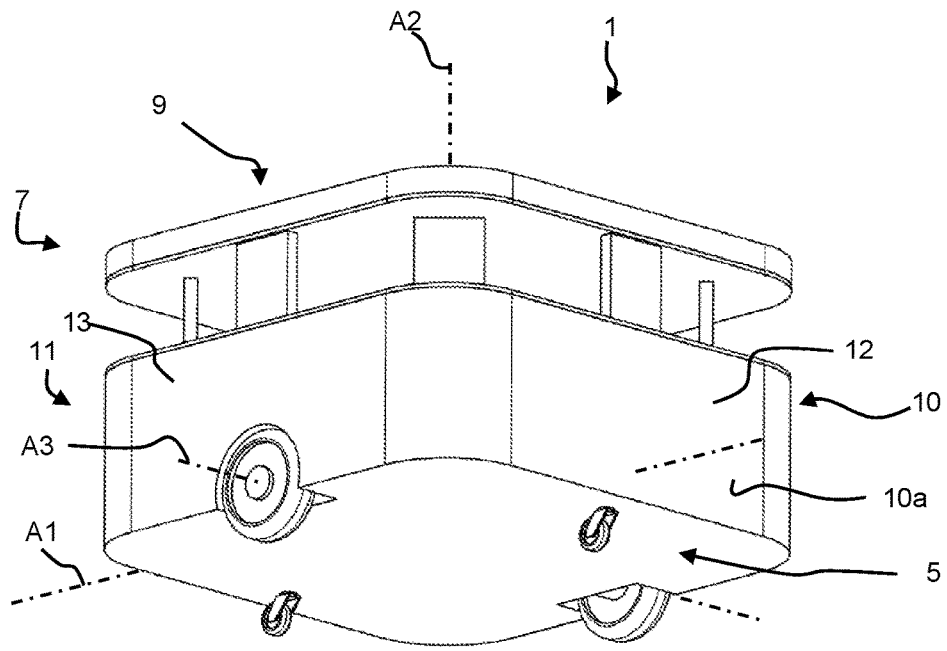
FIG. 1 shows a perspective illustration of an embodiment of the vehicle according to the invention, wherein the vehicle comprises a running gear with four wheels, of which two first wheels are designed in their combination as differential rotating wheels and of which two further wheels are each designed as support wheels.

By means of the figures, embodiments of the vehicle 1 according to the invention, of the logistics system according to the invention and of the method according to the invention are described in each case in variants and mutually alternative embodiments with features. The features by which the further alternative embodiments differ from the variants can also be present according to the invention on all the embodiments described herein specifically both as an alternative to functionally identical or functionally similar features and as additional features.

DETAILED DESCRIPTION

The embodiments of the vehicle 1 according to the invention, in combination with otherwise any variant of the vehicle described herein, may be realized according to one or more of the following controls:

(S1) the vehicle is a manned vehicle having a vehicle system which has available current vehicle actual positions and comprises in particular a vehicle sensor device for determination current vehicle actual positions in each case and which comprises control elements which can be actuated by a person, wherein by actuating the control elements control commands are generated and transmitted to the drive device, which moves the vehicle on the operation surface as a function of the control commands, wherein the control commands are input due to control target specifications provided by the vehicle system, e.g, a display thereof;

(S2) the vehicle is a self-controlling vehicle having a vehicle system which generates control target specifications, wherein the same are transmitted to a drive control device of the vehicle which, on the basis of the control target specifications, transmits control commands directly or indirectly to the vehicle drive device, by means of which the vehicle moves on the operation surface as a function of the control commands;

(S2) the vehicle is a self-controlling vehicle having a vehicle system, wherein control target specifications are generated by an external device, such as in particular a logistics central device arranged in a stationary manner in the operation area, wherein the same are transmitted via radio to a vehicle communication device of the vehicle and from the latter to a drive control device of the vehicle which, on the basis of the control target specifications, transmits control commands directly or indirectly to the vehicle drive device, by means of which the vehicle moves on the operation surface as a function of the control commands.

The vehicle 1 according to the invention can thus be driven in particular in a controlled or self-controlling manner, that is to say with or without manual control, and, in particular by means of corresponding functions provided according to the invention, performs, in a self-controlling manner, at least one predefined transfer task or performs a sequence of transfer mission tasks. A predetermined transfer mission task includes moving the vehicle 1 with a cargo unit L along a target trajectory to a unit load receiving device 100 and the transfer of a unit load L to the unit load receiving device 100.

FIG. 1 shows, by way of example, a reference system KS-F for the vehicle 1, as can also be defined for the functions used according to the invention. FIG. 1 shows, for example, a longitudinal axis A1, a vertical axis A2 and a transverse axis A3 for the vehicle 1. In particular, it can be provided that these axes A1, A2, A3 converge at a point of the vehicle 1 which is defined as the center ZF of the vehicle 1. A different point and generally any point may also be defined as the center of the vehicle 1. In particular, a center line can be a longitudinal axis A1 of the vehicle 1. For example, these definitions may be defined for the functions used according to the invention. For example, in these functions, information regarding position or velocity or both position and velocity of the vehicle 1 refers to such a center of the vehicle 1. These definitions may be performed individually or in any combination for the functions used according to the invention.

As also shown in FIG. 1, the vehicle 1 comprises a running gear 5, which adjusts the direction of the vehicle 1 on an operation surface E of the operation area B, and a vehicle frame 10 fastened thereto. Vehicle frame 10 comprises a receiving component 7 on which at least one unit load L can be placed. The vehicle frame 10 can also be formed from a base part 8 and the receiving component 7, the receiving component 7 being fastened to the base part 8 and being situated above the base part 8 in particular opposite to the direction of gravity. The invention also relates to a method for producing the same. Furthermore, the receiving component 7 may have a receiving surface 9 which is oriented opposite the direction of gravity. Such a receiving surface 9 is provided for placing at least one unit load L.

The vehicle frame 10 can comprise an outer surface 10*a* which is oriented at least in a section along the planar extension of the operation surface E. The vehicle frame 10 can be formed or consist of an outer wall with the outer surface 10*a*. The outer wall can be a circumferential outer wall of the vehicle 1 with the outer surface 10*a*, which forms a circumferential outer wall. The outer wall of the vehicle 1 can also form an outer wall of the vehicle 1, which is formed in a section on the vehicle 1, with the outer surface 10*a*. The vehicle frame 10 can also be formed from a grid, a frame or a beam extending in the circumferential direction, in each case with the outer surface 10*a*. Furthermore, the vehicle frame 10 can be formed in each case with the outer surface 10a from combinations of each of the alternatives mentioned for this purpose.

The outer surface 10a of the vehicle 1 thus forms a vehicle contact surface or comprises at least one vehicle contact surface with which the vehicle 1 can be brought into contact with the unit load receiving device 100. As described, the vehicle 1 can comprise a plurality of vehicle contact surfaces which are oriented in different directions relative to one another. The term "contact" in connection with the unit load receiving device 100 is here in particular a contacting of the vehicle 1 and the unit load receiving device 100 and/or an impact of vehicle 1 against the unit load receiving device 100, by which the vehicle 1 experiences an acceleration during its movement along or on the target trajectory. In the embodiment of the vehicle 1 shown in FIG. 1, the vehicle frame 10 has four contact surfaces 11, 12, 13, 14. A contact or contact surface of the vehicle frame 10 may be any surface of the vehicle 1 herein, in particular a surface having an orientation that extends along the surface extension of the operation surface E.

The vehicle 1 comprises a drive device 30 arranged on the vehicle frame 10 with at least one motor and optionally additionally a braking device. The drive device 30 is coupled to the running gear 5 and drives the running gear to adjust the velocity and direction of the vehicle 1. In particular, the running gear 5 comprises a plurality of wheels which are each mounted in a wheel suspension of the running gear 5 and on which the vehicle 1 can be moved and positioned on the operation surface E. In this case, the running gear 5 comprises at least two wheels. The drive device drives at least one wheel of these wheels of the running gear 5 and for this purpose is coupled to the respective one of the at least one wheel.

Figure 2:
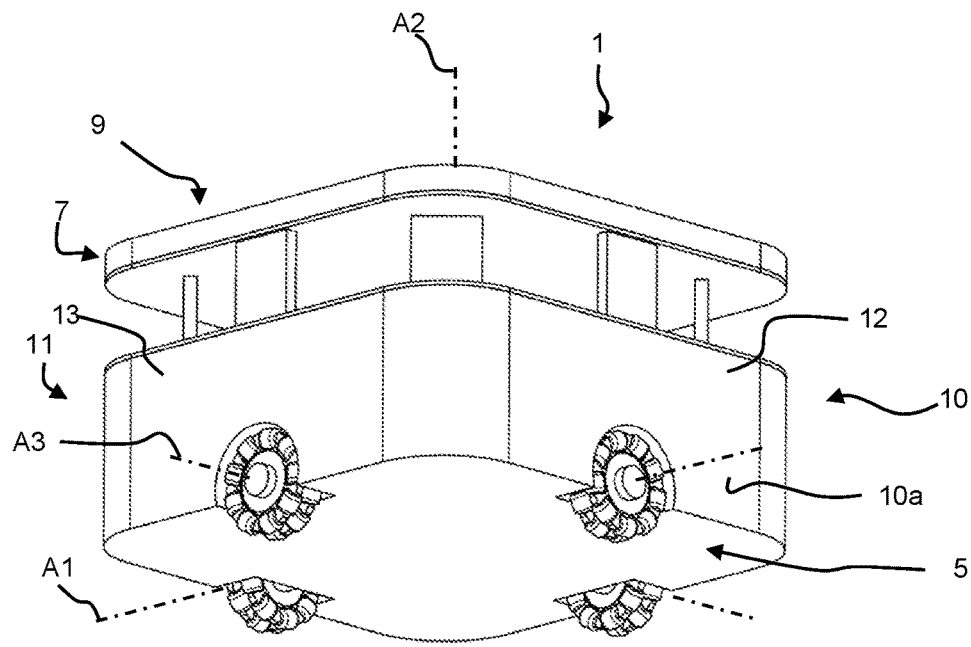
FIG. 2 shows a perspective illustration of an embodiment of the vehicle according to the invention, wherein the vehicle comprises a running gear with four wheels, which are designed in their combination as omni-directional wheels.

For example, the wheel suspensions of in each case two wheels can be mounted cardanically, so that the respective two wheels of in each case one steering device of the running gear 5 which is coupled to the wheel suspensions of the two wheels and is connected to the drive device, can each be rotated about an axis of rotation extending transversely to the axes of rotation. A predetermined direction of travel and velocity of the vehicle 1 is adjusted on the basis of corresponding control commands which are generated by the drive device and transmitted to the running gear 5 of the vehicle 1. In particular, a predetermined direction of travel of the vehicle 1 can be set on the basis of corresponding control commands which are generated by the drive device and transmitted to the running gear 5. In these embodiments of the vehicle 1, it can be provided, for example, that two wheels or two pairs of wheels of a total of four or more than four wheels can carry out steering movements. FIG. 1 shows a perspective illustration of an embodiment of the vehicle according to the invention, wherein the vehicle comprises a running gear with four wheels, of which two first wheels, which are each arranged opposite one another with respect to a longitudinal axis of the vehicle, are designed in their combination as differential rotating wheels, and of which two further wheels, which are formed viewed in the longitudinal axis between the two first wheels and in each case with respect to a transverse axis of the vehicle, are arranged opposite one another and are designed as support wheels, and FIG. 2 is a perspective view of an embodiment of the vehicle according to the invention, wherein the vehicle comprises a running gear with four wheels, which are designed as omni-directional wheels or all side rollers.

In general, the running gear 5 of the vehicle 1, in particular in the case of a cardanic suspension, can be designed in such a way that at least one pair of opposing wheels are coupled to one another via a steering device. In this case, the steering device is designed in such a way that the wheels can be rotated about their steering axis in order to adjust the direction of travel of the vehicle. The steering device may be operatively coupled to the vehicle propulsion device.

In an embodiment of the running gear with omni-directionally operable wheels or side rollers, the running gear can also be designed without a steering device. The omni-directionally operable wheels or all side rollers can be functionally coupled to the vehicle drive device in such a way that the direction of movement of the vehicle to be set according to the respective control target specifications is adjusted by different rotational velocities of the individual wheel. Accordingly, the wheel suspensions and wheels of the vehicle 1 can also be designed in such a way that the wheels of the vehicle 1 are realized as omni-directional wheels of the running gear. The vehicle 1 in the embodiment with omni-directional wheels can be moved from a current position in each direction of travel, provided that there are no obstacles on the contact support in this respect. For this purpose, the running gear 5 of the vehicle 1 can have a steering device which is coupled to each of the wheel suspensions of a respective wheel for adjusting the direction of rotation of each wheel and is connected to the drive device. Alternatively, a predetermined direction of travel and velocity of the vehicle 1 can be set on the basis of corresponding control commands which are generated by the drive device and transmitted to the running gear 5 of the vehicle 1 In particular, in order to adjust the direction of the vehicle 1, the corresponding control commands are transmitted to the steering device.

Furthermore, the vehicle comprises a control function 50, which is functionally connected to the drive device and determines control commands on the basis of control target specifications and transmits said commands to the drive device 30. The drive device 30 generates actuating commands or actuating signals from the control commands to the running gear in order to drive the wheels of the vehicle 1 and to move the vehicle 1 in a corresponding manner on the operation surface and, on the basis of a vehicle current state of the vehicle 1, to adjust a vehicle target state of the vehicle 1 on the operation surface E.

Figure 3:
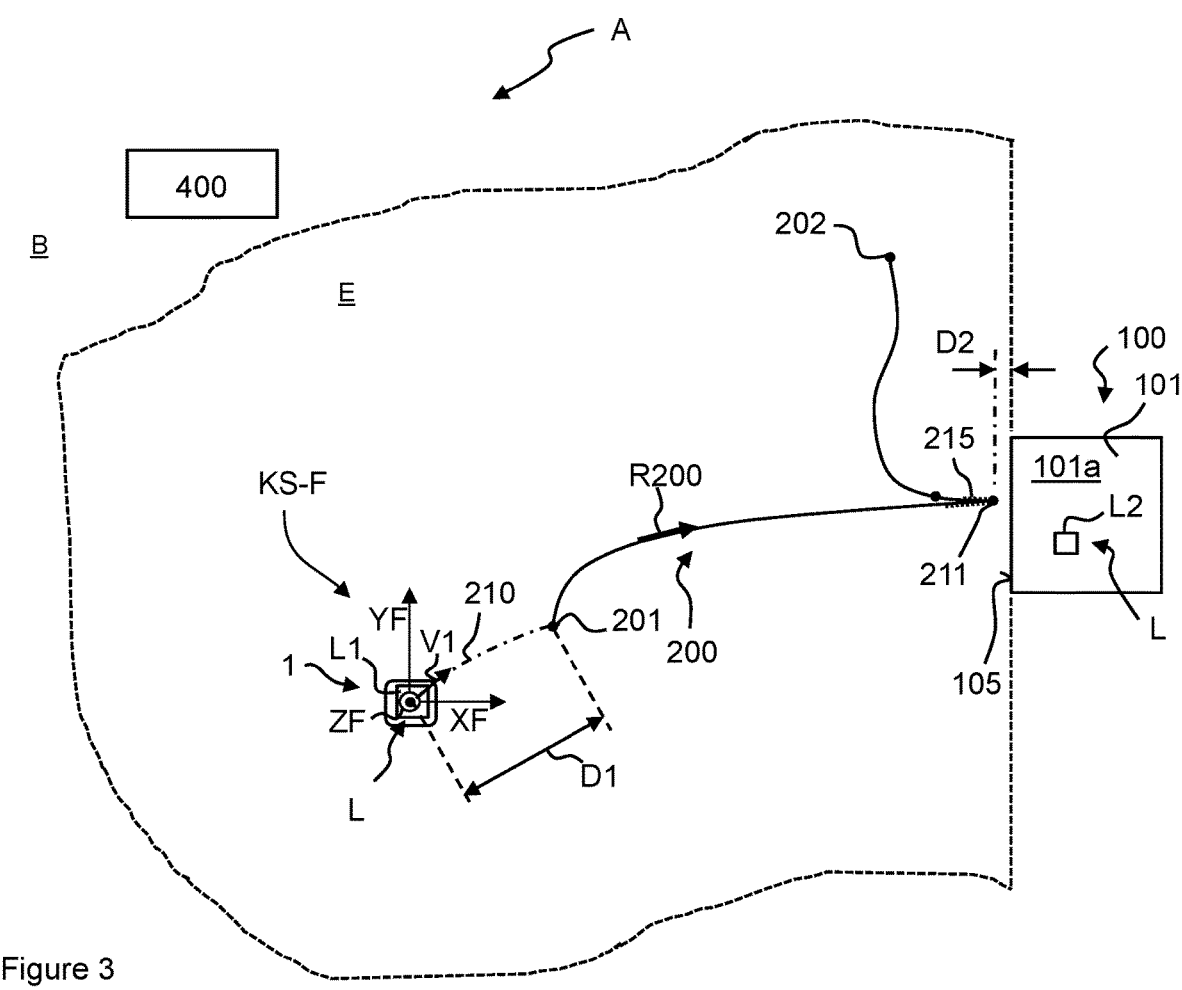
FIG. 3 is a schematic illustration of a first operating constellation on an operation surface, the first operating constellation comprising: a vehicle, a unit load receiving device, and a first a target trajectory which leads to the unit load receiving device, which is designed in such a way that the vehicle experiences a frontal impact with direction reversal at the unit load receiving device.
Figure 4:
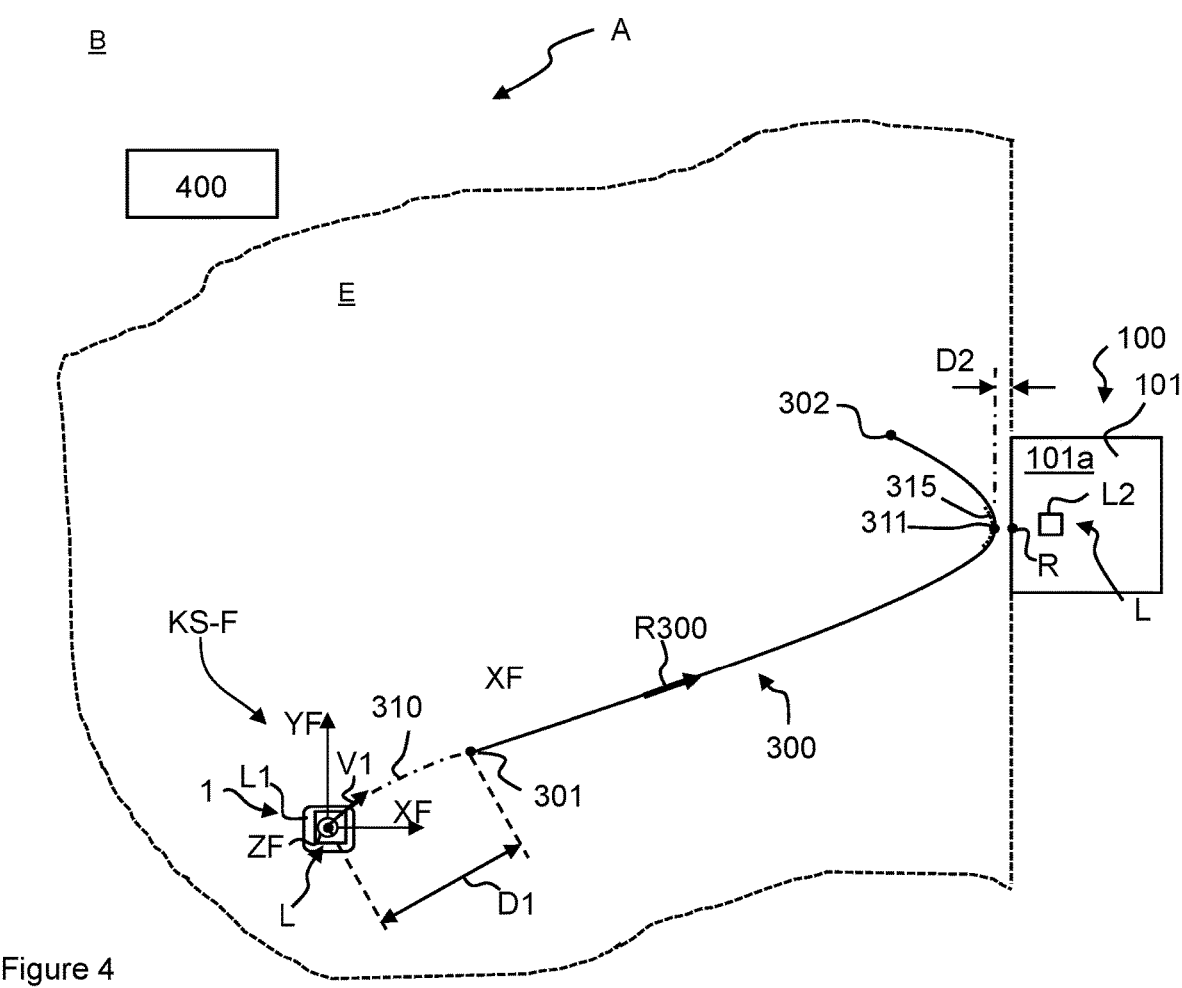
FIG. 4 is a schematic illustration of a first operation constellation on an operation surface, the first operating constellation comprising: a vehicle, a unit load receiving device and a first a target trajectory which leads to the unit load receiving device, wherein the target trajectory is designed in such a way that the vehicle drives past the unit load receiving device or laterally abuts the unit load receiving device.

According to the invention, in an initial state, which is shown by way of example in FIGS. 3 and 4, at least one vehicle 1 is located in a first vehicle-current state at a distance from the unit load receiving device 100. The output state distance can result in particular from previous movements of the vehicle 1. The output state distance can be defined in particular as the distance between a predefined center ZF of the vehicle 1 and a predefined reference point R or a reference position R of the unit load receiving device 100 or on the unit load receiving device 100. The reference point of the unit load receiving device 100 can be a point or a region and in particular any desired location of the unit load receiving device 100 or outside the unit load receiving device 100, wherein the reference point R is situated fixedly, that is to say invariable, in a receiving device-fixed coordinate system. The reference point of the unit load receiving device 100 can in particular be a region such as, for example, a surface region or a point such as, for example, a surface point of the unit load receiving device 100 or a contact surface 105 thereof, the orientation of which runs along the extension of the operation surface E. However, the output state distance may also refer to other points or locations of the vehicle 1 and the cargo unit receiving device 100. For example, the output state distance can be defined as the distance between the reference point or the surface center point of an outer surface 10a of the vehicle 1 provided for contacting the contact surface and the surface center point of an outer surface 10a of the vehicle 1, which is provided for contacting the contact surface, and the surface center point of a lay-on surface or contact surface 105 of the unit load receiving device 100.

The vehicle 1 operates on the basis of a target trajectory ST, which is arranged between an initial point and an end point in a locally variable or locally invariable trajectory direction RST and which comprises a transfer region 215 with a target transfer point assigned to the unit load receiving device.

FIGS. 3 and 4 show, by way of example, a target trajectory ST relative to the unit load receiving device 100. In FIG. 3, reference numeral 200 is assigned to the target trajectory ST. The target trajectory 200 runs between an initial point 201 and an end point 202 in a locally variable or locally unchangeable trajectory direction R200 and comprises a transfer region 215 with a target transfer point 211 which is assigned to the unit load receiving device 100. In FIG. 4, reference numeral 300 is assigned to the target trajectory ST. The target trajectory 300 runs between an initial point 301 and an end point 302 in a locally variable or locally unchangeable trajectory direction R300 and comprises a transfer region 315 with a target transfer point 311 assigned to the unit load receiving device 100.

The reference point R can also be identical to the target transfer point 211. The reference point R is a reference point preferably on the unit load receiving device 100. The reference point R can be the target point for the transfer movement of the unit load L from the vehicle 1 to the unit load receiving device 100, i.e. the reference point R can in particular be the point or the location or the region in the vicinity of which the unit load L is to be moved onto the unit load receiving device 100. The reference point R can also define the target point or the target region, at which, in the case of a corresponding course of the target trajectory, in order to achieve the transfer movement of the unit load L from the vehicle 1 to the unit load receiving device 100, the vehicle 1 is intended to contact the unit load receiving device 100.

The target transfer point 211, 311 is preferably that point on the target T trajectory at which the vehicle 1 experiences an acceleration which causes the vehicle 1 to accelerate, as a result of its mass inertia, the unit load L lying on the receiving component 7 and in particular on the receiving surface 9 is transferred from the receiving component 7 or from the receiving surface 9 of the vehicle 1 to the reference point R and, in particular, a receiving component 101, which in particular can comprise a receiving surface 101a of the unit load receiving device 100. The receiving surface 101 is oriented at least in a section opposite to the direction of gravity so that a unit load L can be conveyed to the latter, in particular by free movement.

The target transfer point 211 or 311 lies in a transfer region 215 or 315 of the target trajectory 200 or 300, wherein the transfer region 215 or 315 is a portion of the target trajectory 200 or 300. In this case, the target transfer point 211 or 311 can lie in a region within the transfer region 215 or 315 of the target trajectory 200 or 300 or centrally in the transfer region 215 or 315 or at an edge of the transfer region 215 or 315 and in particular also an edge point of the transfer region 215 or 315.

The transfer regions 215, 315 of the respective target trajectory 200 or 300 are illustrated schematically in FIGS. 3 and 4 by way of example in each case with a dotted line. The length of the transfer region 215, 315 is defined or defined depending on the application case. The length of the transfer region 215 is, in terms of the amount thereof, sufficient for the generation of a required acceleration to the vehicle 1 in the transfer region 215, 315 and in particular in the target transfer point 211 or 311 in order to move the unit load L located on the receiving component 7 of the vehicle 1 by its mass inertia onto the unit load receiving device 100. For example, the length of the transfer region 215, 315 is the amount after at least 50% of the length of the vehicle 1. Alternatively, the length of the transfer region 215, 315 can amount to at least the length of the vehicle 1 and specifically at least 1.5 times the length of the vehicle 1. In this regard, the length of the vehicle 1 may be the length of the vehicle 1, which results along the respective target trajectory 200 or 300, or the smallest length of the vehicle 1 standing on the operation surface E, which results in the direction of extension of the operation surface E.

The vehicle trajectory of the vehicle 1 from its respective current vehicle actual position to the target trajectory ST is shown in FIGS. 3 and 4 in each case with a dashed line, wherein the vehicle movement path of FIG. 3 is assigned the reference sign "210" and the vehicle movement path of FIG. 4 is assigned the reference sign "310". In the examples shown, after reaching the respective target trajectory 200 or 300 on its vehicle movement path, the vehicle 1 moves further along this respective target trajectory 200 or 300.

For the description and definition of the target movement of the vehicle 1, a target velocity vector and, for the description and definition of the current movement of the vehicle 1, an current velocity vector V1 is assigned to the same. For the description and definition of the target movement of the vehicle 1, a target velocity and a target acceleration as well as a target speed profile are also assigned to the same.

The target or actual velocity vector has the value zero when the predetermined target velocity is equal to zero, or when the vehicle 1 is motionless on the operation surface E, and has a non-zero magnitude when the vehicle 1 is in motion, wherein the direction of the target or actual velocity vector indicates the predetermined or current direction of travel of the vehicle 1. In the case of an actual movement of the vehicle 1 with the respective current velocity vector V1 for fulfilling the transfer mission task, it can be provided starting from the respective current output state Z1, in particular already in this initial state Z1 or in another state chronologically before or after the respective current output state Z1 is moved along the target trajectory ST by means of a path guidance function or path control function. This path guidance function or path control function can be defined by determining a deviation relation between the respective current vehicle actual state, which is defined at least with a vehicle actual position, in each case relative to the target trajectory ST and, for example, to a point of the target trajectory ST that is determined or defined currently. The currently defined point of the target trajectory ST can be, for example, a point which is located at the smallest distance from the respective current vehicle actual position. Instead of the smallest distance, a different distance or a different relation between the current vehicle actual state and the currently determined or defined point of the target trajectory ST can also be used. Target trajectory follow-up commands are determined from the deviation relation by means of the path guidance function or the path control function. The target trajectory follow-up commands are control target inputs which are converted into control commands. The control commands are suitable for actuating the drive device 30 in a corresponding manner in order to move the vehicle 1 along the target trajectory ST on a vehicle movement path.

The target trajectory follow-up commands can be predefined. According to the invention, the target trajectory follow-up commands can also be determined. The determination of target trajectory follow-up commands in particular on the basis of a deviation relation and the transmission of the same to the drive device can in each case take place by means of a target trajectory follow-up function 60.

Alternatively or additionally, it can be provided that the target trajectory follow-up function 60 is a functional component of a trajectory control function and, in particular, a functional component of the vehicle control function 50 of the vehicle 1 or a logistics central device 400. Independently of this, it can be provided that the load transfer control function 70 is a functional component of the vehicle control function 50 of the vehicle 1 or of a logistics central device 400.

Vehicle control function 50 can be a functional component of a vehicle system S which is functionally integrated in the vehicle 1, i.e. that the vehicle control function 50 is functionally connected to the drive device 30 and, on the basis of control command specifications, determines control commands and transmits them to the drive device 30 in order to adjust a current actual velocity vector of the vehicle 1 in each case. In particular, an algorithm can be stored in the target trajectory follow-up function 60 which defines the target trajectory follow-up function and which provides the target trajectory follow-up commands of the vehicle control function 50. Optionally, it can be provided that the vehicle control function 50 uses or determines velocity commands on the basis of an activation of the target trajectory follow-up function 60 and acts as control commands to the drive device 30 is transmitted.

Furthermore, the vehicle control function 50 can comprise a load transfer control function 70 which, on the basis of at least one transfer region 215, 315 of the target trajectory ST, 200 300, uses or determines a determined or predefined target speed profile with a constant or variable velocity and optionally a determined or predefined target acceleration profile for the vehicle 1 as control target specifications is and transmits the same as control commands to the drive device 30.

In general, it can be provided that the control target specifications with regard to each relevant point in time and in particular to each calculation time of the vehicle system S are put in relation to the current state of the vehicle 1 of the respective point in time and optionally are compared and control commands for the drive device 30 are determined therefrom. The control commands are determined in such a way that the current state of the vehicle 1 which corresponds to the respective point in time changes to the target state relevant to the respective point in time. The determination of control commands for the respective point in time can be provided, in particular, using a control method or an estimation method. Due to the control commands, the drive device 30 adjusts a transfer velocity of the vehicle 1 in the transfer region 215, 315 or along the transfer region 215, 315 and optionally a target acceleration of the vehicle 1 in the target transfer point 211, so that the unit load L located on the receiving component 7 of the vehicle is transferred by its mass inertia to the unit load receiving device 100.

In particular, an algorithm can be stored in the vehicle control function 50, which defines the target trajectory follow-up function 60 and determines the target trajectory follow-up commands. Independently of this, it can be provided that in particular an algorithm is stored in the vehicle control function 50 which defines the load transfer control function 70 and for the vehicle 1 determines the target speed profile along the transfer region 215, 315 and optionally a target acceleration profile along the transfer region 215, 315, an optionally a target acceleration in the target transfer point 211, 311.

The vehicle 1 which is schematically illustrated in FIGS. 3 and 4 is, for example at the start of the method according to the invention, in the initial state shown in each case in FIGS. 3 and 4 and has a vehicle current state to which at least one current vehicle actual position and optionally a vehicle actual velocity belongs, in which the vehicle 1, or the center ZF of the vehicle 1, is at an initial state distance D1 to the initial point 201, 301.

According to the invention, control target specifications are provided for the vehicle 1, from which, in the target transfer point 211, 311 or at least one section of the transfer region 215 extending to the target transfer point 211, with a specific form of the transfer region 215, 315, a transfer acceleration of the vehicle 1 and optionally a transfer lateral acceleration and/or a negative transfer longitudinal acceleration result. According to the embodiments of the invention, the target trajectory ST can have a profile in which the target transfer point 211, 311 has a position relative to the unit load receiving device 100 or to a contact surface 105 of the unit load receiving device 100 which causes no or a more or less powerful contacting or abutment or stop of the vehicle 1 on the unit load receiving device 100 or the contact surface 105 thereof, wherein in the target transfer point 211 a predefined or determined target velocity vector or a predefined or determined target velocity and, depending on the form of the target trajectory ST, optionally additionally a predefined or determined target acceleration of the vehicle 1 and in particular a negative target acceleration is provided in order to carry out a transfer acceleration of the vehicle 1, that is to say a current transfer acceleration, by which one or more of the following acceleration specifications (b1), (b2), (b3) are achieved:

(b1) a transfer lateral acceleration,
(b2) a negative transfer longitudinal acceleration with a reduction of the vehicle current velocity,
(b3) a combination of transfer lateral acceleration and negative transfer longitudinal acceleration.

The transfer acceleration is that acceleration of the vehicle 1, which is effected as a result of control commands or of a contacting of the unit load receiving device 100 or of both control commands and such a contacting. In this case, the transfer acceleration can be sufficient for the unit load L, in the case of a corresponding form of the transfer region 215, 315 of the target trajectory ST, 200, even without contacting the unit load receiving device 100 that the unit load L is moved on the receiving device 100 due to its inertia.

Herein, "negative transfer longitudinal acceleration" is understood to mean a negative acceleration of the vehicle 1, that is to say a reduction in the velocity of the vehicle 1 which is exerted on the vehicle 1 at least in a section extending up to the target transfer point 211. The negative transfer longitudinal acceleration may be partially or entirely effected by a braking acceleration of the vehicle 1, which is commanded by a drive device 30, and thus in the case of a correspondingly commanded speed profile of the vehicle 1. For this purpose, alternatively or additionally, the negative transfer longitudinal acceleration can take place, in the case of a respective form of the transfer region 215, 315, partially or entirely by an bumping of the vehicle 1 into the unit load receiving device 100.

According to the invention, in particular that the combination of the following measures are taken to achieve a transfer acceleration of the vehicle 1, which is required in order to transfer the unit load L located on the receiving component of the vehicle 1 by its mass inertia to the unit load receiving device 100:

(M1) a specific shape or form of the transfer region 215, 315, optionally with a defined position of the transfer point 211, 311 relative to the unit load receiving device 100 and in particular to the contact surface 105

(M2) a speed profile, which is commanded by means of velocity commands to the drive device 30 as control commands, at which speed profile, in particular, the velocity is constant at least in a section of the transfer region 215 or 315 up to the target transfer point 211, 311, or in particular a reduction in the velocity is set at least in this section.

The respective acceleration specification for the acceleration, which the vehicle 1 is to have in the transfer region 215, 315 or in the target transfer point 211, 311, is dimensioned in such a way that the unit load L is moved by its mass inertia from the receiving component 7 to the unit load receiving device 100. The state of the unit load L on the vehicle 1 is denoted by the reference sign "L1" in FIGS. 3 and 4, while the state of the unit load L on the unit load receiving device 100 is denoted in FIGS. 3 and 4 by the reference sign "L2".

The target trajectory 200 according to FIG. 3 comprises a course in which the transfer region 215 extending between the initial point 201 and the end point 202 comprises a first portion 216 and a second portion 217 which run at least in a section along one another and run in opposite directions with respect to the direction of movement of the vehicle 1. Based on the target movement direction 8200 of the vehicle 1, the first section 216 runs to the target transfer point 211 and up to this target transfer point 211, that is to say including the target transfer point 211, and in the direction of the unit load receiving device 100, while the second section 217 extends, when viewed in the target movement direction 8200, away from the target transfer point 211. As a result, a movement reversal of the vehicle 1 takes place in the target transfer point 211, in the case of a target speed profile defined as a control target specification, so that the target transfer point 211 is a motion reversal point in which the velocity vector is equal to zero. The reversal of movement can be carried out according to one of the following alternatives (BU1), (BU2), (BU3):

(BU1) Vehicle 1 moves on the target trajectory 200 or along the target trajectory 200 in its respective current direction of travel 8200 in the direction of the transfer region 215, wherein the commanded target velocity up to the target transfer point 211, that is to say at least to just before the target transfer point 211, is different to zero and is sufficient that, by pushing the vehicle 1 against the unit load receiving device 100 and in particular the contact surface 105, a braking acceleration is exerted which is equal to or greater than the negative transfer longitudinal acceleration, wherein the drive device 30 of the vehicle 1 does not make a contribution to the negative transfer longitudinal acceleration or exerts a contribution to the negative transfer longitudinal acceleration directly before the target transfer point 211, that is to say in the first section 216, i.e. no braking of the vehicle 1 is carried out. The braking acceleration of the vehicle 1 by pushing the vehicle 1 against the unit load receiving device 100 can optionally be additionally combined with a recoil impulse so that the vehicle 1 thereby executes a reversal of movement. Independently of this, it can be provided that control commands are transmitted to the drive device 30 through which the vehicle 1 in the second portion 217 is removed from the unit load receiving device 100 toward the end point 202.

(BU2) The vehicle 1 moves on the target trajectory 200 or along the target trajectory 200 in its respective current direction of travel R200 in the direction of the transfer region 215, wherein the commanded target velocity is different to zero up to the target transfer point 211, that is to say at least to just before the target transfer point 211, and additionally directly in front of the target transfer point 211 that is to say in the first section 216, the drive device 30 of the vehicle 1 exerts a commanded braking acceleration on the vehicle 1 until the vehicle 1 strikes against the unit load receiving device 100 and in particular the contact surface 105 at a velocity different to zero so that, together with the braking acceleration, a negative transfer longitudinal acceleration is exerted on the vehicle 1. The braking acceleration of the vehicle 1 can optionally be additionally combined, by pushing the vehicle 1 against the unit load receiving device 100, with a strike impulse so that the vehicle 1 thereby executes a reversal of movement. Independently of this, it can be provided that control commands are transmitted to the drive device 30 through which the vehicle 1 in the second portion 217 is removed from the cargo unit receiving device 100 toward the end point 202.

(BU3) The vehicle 1 moves on the target trajectory 200 or along the target trajectory 200 in its respective current direction of travel R200 in the direction of the transfer region 215 and experiences a braking acceleration or negative transfer longitudinal acceleration in such a way that the commanded target velocity is equal to zero up to the target transfer point 211. In this case, provision can be made for a contact or no contact between the vehicle 1 and the unit load receiving device 100 and in particular the contact surface 105 to take place in the target transfer point 211, whereby no recoil impulse is exerted on the vehicle 1. The occurring braking acceleration is thus equal to or greater than the negative transfer longitudinal acceleration for transferring the unit load L to the unit load receiving device 100. The reversal of the movement of the vehicle 1 takes place in that control commands are transmitted to the drive device 30 through which the vehicle 1 in the second portion 217 is removed from the cargo unit receiving device 100 toward the end point 202.

In the case of the motion reversal alternatives (BU1) and (BU2), the velocity commands transmitted to the drive device 30 of the vehicle 1 include commands for generating a negative transfer longitudinal acceleration that is to say a braking acceleration to the vehicle 1 by the drive device 30. The velocity commands for realizing a target speed profile are used or determined in particular in the load transfer control function 70 as control target specifications and are transmitted as control commands to the drive device 30.

In the transfer region 215, the angle which is located between the tangents to the two sections 216, 217 of the transfer region 215 in the target transfer point 211 may be an acute or an obtuse angle. The section of the transfer region 215 which leads to the target transfer point 211 can have a direction in the target transfer point which is situated in an angular range relative to the extent of the contact surface 105 of the unit load receiving device 100, which is greater in magnitude than 25 degrees.

The vehicle 1 moves in a controlled manner from its initial state as a first vehicle current position along the target trajectory 200 to the target transfer point 211 in which the vehicle 1 traveling along the target trajectory 200 or on the target trajectory 200 executes a movement direction reversal. As described, the movement direction reversal in the case of a target speed profile defined by control target specifications with the required transfer acceleration can be effected exclusively or partially by a bumping of the vehicle 1 into the unit load receiving device 100 or by striking the unit load receiving device 100, but the target speed profile defined by control target specifications can also be designed in such a way that the movement direction reversal takes place without contacting or striking the vehicle 1 with the contact surface 105.

The amount of the negative transfer longitudinal acceleration in the case of a pushing the vehicle 1 against the unit load receiving device 100 or of an impact of the vehicle 1 against the unit load receiving device 100 is determined by the combination of the target speed profile with the definition of the position of the transfer point 211 relative to the unit load receiving device 100 and thus by a distance D2 between the transfer point 211 and the unit load receiving device 100 or the contact surface 105. As a result, the strength of the pulse exerted on the vehicle 1 can be adjusted by pushing the vehicle 1 against the unit load receiving device 100 and thus the amount of the transfer acceleration.

As the target trajectory ST of FIG. 4 shows, the transfer region 215 can run in a curved manner, wherein the unit load receiving device 100 is situated on the convex side of the target trajectory ST. In addition, this may be the case, for example at a distance D2 from the unit load receiving device 100 on the side of the operation surface E. This distance D2 can be dimensioned such that, during the movement of the vehicle 1 on the target trajectory 200 past the unit load receiving device 100 up to the end point 202, no contact between the vehicle 1 and the unit load receiving device 100 occurs. In this case, a required transfer lateral acceleration in the target transfer point 211 acts on the vehicle 1 during the movement of the vehicle 1 along the transfer region 215 which results from at least one target speed profile defined as a control target specification and from control commands which are determined accordingly from a target velocity vector in the target transfer point 211 or transfer region 215. By reaching the required transfer acceleration, the movement of the unit load L is brought about by its mass inertia from the receiving component 7 to the unit load receiving device 100. In this case, in particular, the target speed profile in the transfer region 215 or a portion of the transfer region 215 with the target transfer point 211 may also comprise a constant vehicle velocity but also a reduction of the vehicle velocity along at least one portion of the trajectory, that is to say a vehicle braking, or an increase in the vehicle velocity along at least one portion of the trajectory, that is to say have a vehicle acceleration.

If, in the case of a course of the target trajectory 200, a curved-shaped transfer region 215, in which the unit load receiving device 100 is situated on the convex side of the target trajectory ST, is provided and the distance D2 between the target transfer point 211 and the unit load receiving device 100 is less than the distance D2, in which there is no contact between the vehicle 1 and the unit load receiving device 100, and the target transfer point 211 is located sufficiently close to the unit load receiving device 100, the vehicle 1 which moves in the target transfer point 211 with the commanded target velocity vector or the commanded target velocity, experiences (i) a first component of the transfer acceleration and in particular of the transfer lateral acceleration by the movement along the curved-shaped transfer region 215 of the target trajectory 200 in the transfer area 215 and (ii) a second component of the transfer acceleration and in particular of the transfer lateral acceleration by striking the vehicle 1 against the unit load receiving device 100 or a contact surface 105 thereof facing the operation surface E.

The smaller the distance D2, the greater is the second component of the transfer acceleration and in particular the transfer lateral acceleration during the movement of the vehicle 1 in the transfer region 215 along the unit load receiving device 100.

According to the invention, in combination with otherwise any variant or embodiment of the vehicle of the logistics system or of the method described or contained herein, the target trajectory ST and/or the transfer region and in particular the shape of the transfer region are in each case with the position of the transfer point 211, 311 relative to the unit load receiving device 100 or the distance between the transfer point 211, 311 and the unit load receiving device 100 can be predefined. As an alternative to this, it can be provided according to the invention that the target trajectory ST and/or the transfer region and in particular the shape of the transfer region is determined in a target trajectory determination function, wherein the target trajectory determination function can be realized in a vehicle system S or a logistics central device 400 arranged in a stationary manner in the operation area. The target trajectory ST determined in the target trajectory determination function can in particular have an initial point 201, an end point 202 and a target transfer point 211 and with a transfer region 215 located between them in particular with a uniformly curved profile, wherein the unit load receiving device 100 is situated on the convex side of the curvature of the transfer region 215. The target trajectory determination function can be designed in such a way that the distance D2 between the target transfer point 211 and the unit load receiving device 100 comprises a predetermined or determined amount. As a result, by determining a suitable target trajectory ST and/or the transfer region and in particular the shape of the transfer region with the described profile, a required transfer acceleration and in particular transfer lateral acceleration can be achieved, which results from the first component (i) of the transfer acceleration and in particular transfer lateral acceleration and optionally additionally the second component (ii) of the transfer acceleration and in particular hand-over lateral acceleration of the vehicle 1.

In order to determine the target trajectory ST, it can be provided that the target trajectory determination function contains or is able to functionally relate to a predefined and e.g. stored trajectory form of the target trajectory ST or a target trajectory course and/or the transfer region, and in particular a form of the transfer region. The at least one trajectory shape or the shape of the transfer region can be defined in particular by a mathematical function, which is described, for example, with coordinate axes of a coordinate system, wherein the coordinate axes can be arranged in such a way that they span the operation surface E or their substantial extension. The at least one trajectory shape or the shape of the transfer region can be used in particular as a parabolic function or as a spline function or as another predefined function in the target trajectory determination function or in a function assigned to it. In this case, it can additionally be provided in the target trajectory determination function that a trajectory shape predefined as a function, which comprises at least one parameter, is defined, so that this at least one parameter can in each case be equated to a specific value in order to define the respective trajectory shape or the shape of the transfer region as a specific function or to vary this respective function in order to determine the appropriate trajectory shape or the shape of the transfer region.

In addition, the target trajectory determination function can comprise an adaptation function which varies the at least one parameter so that by varying or adjusting the at least one parameter of the predefined trajectory shape or the shape of the transfer region, by which the specific target trajectory ST or the specific transfer region is defined and a suitable specific target trajectory ST or suitable shape of the transfer region is determined, with which, in combination with a predefined or determined target speed profile with a target velocity and/or a target acceleration in the target transfer point 211, 311, a required transfer acceleration with one or more of the acceleration specifications (b1), (b2), (b3) can optionally be achieved for the vehicle 1. In this case, it can also be provided that a plurality of trajectory forms or a plurality of forms of the transfer region are predefined, for example, in the target trajectory determination function, and the adaptation function of the target trajectory determination function realizes the described adaptation of a plurality of trajectory shapes or shapes of the transfer region by parameter variation.

As an alternative or in addition, it can be provided that the target trajectory determination function has stored a plurality of specific target trajectory courses, i.e., defined without parameters, for example in each case as a predefined function and selects one of the specific target trajectory courses during the determination of the target trajectory ST. In this case, the target trajectory determination function can have a selection function with which a target trajectory course is selected as a basis for determining the control commands from the selectable target trajectory courses by means of which the transfer acceleration to the vehicle 1 is reached or exceeded in the case of a target speed profile defined by control target specifications in the transfer region and/or a target acceleration in the target transfer point.

In the embodiments according to the invention with an adaptation function of the target trajectory determination function and in embodiments according to the invention with a selection function of the target trajectory determination function, a variation of target speed profiles in the transfer region or, if appropriate, a target acceleration in the target transfer point can be performed, and a value for the transfer acceleration to be achieved as a comparison value or threshold value or minimum value can be used. In this case, it can be provided that the target speed profile or, if appropriate, that target acceleration is selected or determined with which the comparison value or threshold value or minimum value is exceeded at least with respect to other parameter values.

The determination of whether a comparison value or threshold value or minimum value for the target speed profile in the transfer region and/or a target acceleration in the target transfer point is achieved can generally be carried out herein by performing a simulation calculation, with respect to a theoretical transfer acceleration occurring in this case, optionally for one or more of the aforementioned components (i), (ii), based on the predetermined determination variables, such as, for example, the selected target trajectory and/or a target speed profile along the target trajectory or the transition region, and by comparison of this theoretical transfer acceleration with the respective comparison value or threshold value or minimum value. In case that the comparison value or threshold value or minimum value is exceeded by the respectively determined value of the theoretical transfer acceleration, the selection or adaptation, which has led to reach the comparison value, can be identified as a selection or adaptation to be used on the basis of the predetermined determination variables.

The variations of parameters or functions or profiles mentioned herein can be carried out in accordance with a predefined sequence or after a statistical probability or in some other way.

As an alternative or in addition to the aforementioned embodiments of the target trajectory determination function the determination of the target trajectory course can be provided by adapting a predefined shape of the target trajectory course or by selecting a target trajectory course, optionally with adaptation thereof, such that the target trajectory determination function applies at least one trajectory course criterion. In this case, it can be provided that the target trajectory determination function uses as a trajectory course criterion, in particular in the case of a target speed profile defined as a control target specification in the transfer region and/or in the case of a target acceleration defined as a control target specification in the target transfer point of the vehicle, one or more of the following trajectory course criteria (TK1), (TK2), (TK3), (TK4) to ensure the transfer acceleration of the vehicle 1 to be achieved:

(TK1) minimum length from the vehicle actual position or the initial point 201, 301 of the target trajectory ST to the target transfer point 211, 311, (TK2) the maximum curvature of the transfer region 215, 315 is minimal, (TK3) minimum time duration from the vehicle actual position or the initial point of the target trajectory ST to the target transfer point 211, 311 at a predefined speed profile of the vehicle 1 which can be constant over the target trajectory ST or variably over the target trajectory ST, (TK4) minimal energy demand or minimum energy consumption for driving the vehicle 1 from the actual vehicle position or the initial point 201 of the target trajectory ST to the target transfer point 211, 311, (TK5) reliable/process-safe transfer or no incorrect delivery of the unit load L from the vehicle 1 to the unit load receiving device 100, (TK6) minimal utilization of space in the unit load receiving device 100.

In the adaptation function of the target trajectory determination function, it can be provided that said function defines those of the at least one parameter in such a way that the comparison value or threshold value or minimum value is exceeded at least with respect to other parameter values. Alternatively or additionally, at least one of the criteria TK1 to TK6 can be used and, additionally, the at least one parameter can be defined such that one of the aforementioned criteria or a plurality of the aforementioned criteria are met or the largest number of met criteria results.

In the selection function, it can be provided that it selects that of the target trajectory courses and/or those of the transfer regions in which the comparison value or threshold value or minimum value is exceeded least with respect to other target trajectory courses. Alternatively or additionally, at least one of the criteria TK1 to TK6 can be used and in this case the one of the target trajectory courses can be selected that one of the aforementioned criteria or a plurality of the aforementioned criteria are met or the largest number of met criteria results.

According to the invention, the transfer acceleration of the vehicle to be achieved for load transfer by mass inertia of the unit load L in the target transfer point 211, 311 can generally be predetermined as a comparison value in the target trajectory determination function, and the target trajectory determination function may perform a selection or adaptation of a target trajectory course or transfer region, when the limit value is reached combined with the fulfillment of at least one or more of the trajectory course criteria (TK1), (TK2), (TK3), (TK4), (TK5), (TK6).

The mentioned embodiments of the target trajectory determination function, using a predefined target trajectory ST, with an adaptation function, with a selection function, i.e. the embodiments with one or more of these options can each comprise a speed profile determination function, which additionally determines a target speed profile along the respective target trajectory ST or of the respective transfer region for the respective predetermined or determined target trajectory ST, 200, 300 or the transfer region 215 of the respective target trajectory 200 or 300, by which target speed profile the lateral acceleration to be achieved for the vehicle 1 is realized. In this case, the speed profile determination function can be realized in such a way that it starts from a predetermined target speed profile and increases the target speed profile incrementally or in predetermined steps until the simulation calculation results that with a target speed profile defined in this way the comparative value for the acceleration to be achieved is reached or exceeded. In this regard, the target speed profile can be defined with a speed profile function or by a series of target velocities, which are each assigned to a point of the target trajectory, or in some other way. As an alternative to this, the speed profile determination function may have stored different target speed profiles and may perform a simulation calculation gradually for the various target speed profiles with determination of the theoretical transfer acceleration occurring in the target transfer point 211, 311. If the comparison value or threshold value or minimum value is exceeded by the in each case determined value of the theoretical transfer acceleration, which occurs in the target transfer point 211 311, the target speed profile to be used can be identified on the basis of the respectively used target speed profile which has resulted in the reaching of the comparison value. In particular, that target speed profile for the transfer of the unit load L may be used in these embodiments in which the respective theoretical transfer acceleration exceeds the comparison value by the least amount.

In all embodiments, in which a comparison value or threshold value or minimum value is required for the transfer acceleration of the vehicle 1, in particular in connection with the use of a theoretical transfer acceleration, the comparison value or threshold value or minimum value may be determined. For this purpose, a comparison value determination function may be functionally integrated in the respective speed profile determination function in which the comparison value or threshold value or minimum value is determined. In the determination of the comparison value or threshold value or minimum value, it can be provided that factors or influencing factors may be derived from one property value or a combination of a plurality of the following property values:
 (K1) a weight or a weight range of the unit load L,
 (K2) a coefficient of friction between the unit load L and the receiving component 7,
 (K3) a value for the magnitude of the unit load L In this case, the respective influencing factor can be applied to a predetermined comparison value or threshold value or minimum value.

In each embodiment according to the invention with a velocity-determining function, it can be provided that the velocity-determining function uses one or a plurality of the following velocity criteria (GK1), (GK2) as a transfer velocity criterion or speed profile criterion to ensure the transfer acceleration of the vehicle 1 to be achieved:
 (GK1) minimum time duration from the vehicle actual position or the initial point 201 of the target trajectory ST to the target transfer point 211, in particular while maintaining predefined restrictions such as, for example, maximum lateral acceleration of the vehicle 1,
 (GK2) energy demand or energy consumption for driving the vehicle 1 from the vehicle actual position or the initial point 201 of the target trajectory ST to the target transfer point 211.

Furthermore, it can be provided according to the invention that each of the velocity determination functions described herein can be combined with each of the target trajectory determination functions described herein in order to determine both a target speed profile and a target trajectory course or a course of the transfer region. In this case, provision can be made that, for the respectively determined combination of the respectively determined target speed profile with a respectively determined target trajectory course or course of the transfer region, a simulation calculation is carried out with determination of the theoretical transfer acceleration occurring in the target transfer point 211, 311. In this case, it can be provided, in particular, that of the combinations mentioned whose theoretical transfer acceleration exceeds the comparison value or threshold value or minimum value, the combination is used for carrying out the transfer mission task or for the transfer of the unit load L to the unit load receiving device 100 which uses one or more of the following optimization criteria (OK1), (OK2), (OK3), (OK4), (OK5), (OK6) as an optimization target:
 (OK1) minimum length from the vehicle actual position or the initial point of the target trajectory ST to the target transfer point 211, 311,
 (OK2) minimum transfer speed,
 (OK3) minimum time duration from the vehicle actual position or the initial point of the target trajectory ST to the target transfer point 211, 311,
 (OK4) energy demand or energy consumption for driving the vehicle 1 from the vehicle actual position or the initial point of the target trajectory ST to the target transfer point 211, 311,
 (OK5) reliable/process-safe transfer or no incorrect delivery of the unit load L from the vehicle 1 to the unit load receiving device 100,
 (OK6) minimal utilization of space in the unit load receiving device 100.

The optimization criterion (06) has, in particular, for the case that the unit load receiving device 100 is already partially occupied, the goal that the vehicle adapts its target trajectory ST in such a way that the unit load L lands in a targeted manner in an even free region of the unit load receiving device 100.

Figure 5:
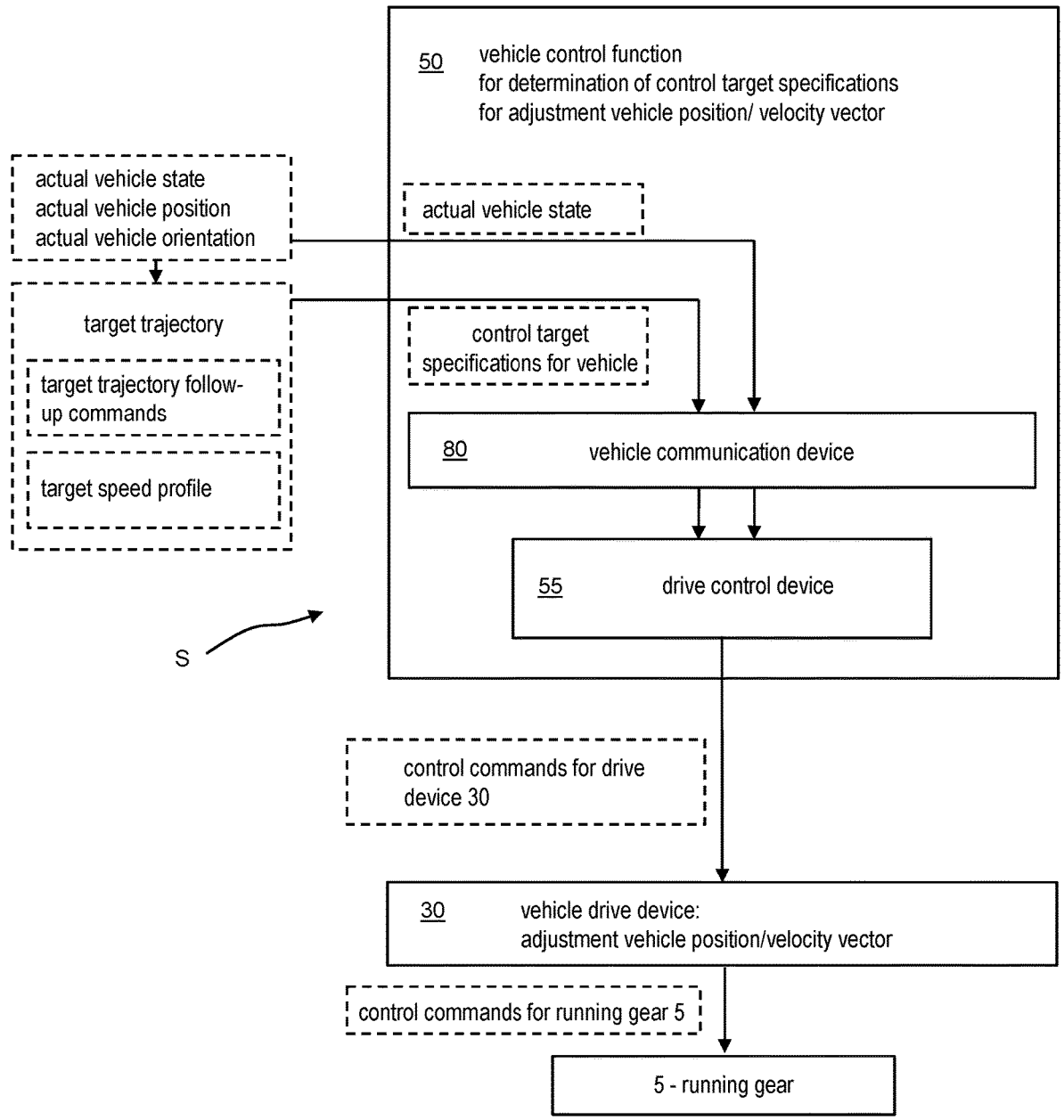
FIG. 5 shows a functional illustration of an embodiment of the vehicle control function according to the invention with its functional integration into the vehicle.

FIG. 5 shows an embodiment of the vehicle system S according to the invention with the vehicle control function 50, a drive control function 55 and a vehicle communication device 80. In this embodiment, it is provided that the vehicle communication device 80 receives control target specifications and optionally in each case current actual vehicle states and provides and transmits the drive control function 55. In the embodiment shown in FIG. 5, the control target specifications received by the vehicle communication device 80 are, in particular, target trajectory follow-up commands and a target speed profile which has target velocities along the respective target trajectory ST or at least along the transfer region 215, 315 of the target trajectory ST, 200, 300, optionally with the at least one target trajectory ST or respective target trajectories ST. The control target specifications are determined as current values in particular at predetermined time intervals and in particular with a predefined Iteration rate from the vehicle communication device 80. Prior to the transmission of the control target specifications to the vehicle communication device 80, the same have been determined on the basis of a current actual vehicle state. In this case, it is provided that the respective current actual vehicle states are determined by an external device which is arranged outside the vehicle and which is arranged in particular in a stationary manner in the operation area B. The determination of the current actual vehicle states in each case can generally be determined by means of a sensor device, for example by means of a camera and corresponding transformation of the sensor data into a coordinate system assigned to the operation surface E. Optionally, the respective current actual vehicle states are received as values of such a coordinate system from the vehicle communication device 80. On the basis of the respective target trajectory ST and the respective current actual vehicle states in this embodiment, target trajectory follow-up commands, for example as a target direction vector of the vehicle 1, and the target speed profile are determined by an external device and transmitted to the vehicle communication device 80, so that these control target specifications are received by the vehicle communication device 80. The vehicle communication device 80 transmits target trajectory follow-up commands for the respective target trajectory ST and the respective current actual vehicle states as control target specifications according to an embodiment described herein to the drive control function 55. On the basis of the respective control target specifications, the drive control function 55 determines control commands for adjusting a velocity vector of the vehicle 1 which are transmitted to the drive device 30. The control commands can include, for example, steering commands or direction change commands or acceleration commands. The control commands are suitable for the drive device 30 to transform these in running gear control commands which are transmitted to the running gear 5 and which are suitable that the running gear 5 moves the vehicle 1 along the target trajectory ST and in particular along the transfer region 215, 315 and as result realizes the transfer acceleration of the vehicle 1 to be achieved at least in a section, which comprises the target transfer point 211 311, 311, or in the target transfer point 211, 311.

Figure 6:
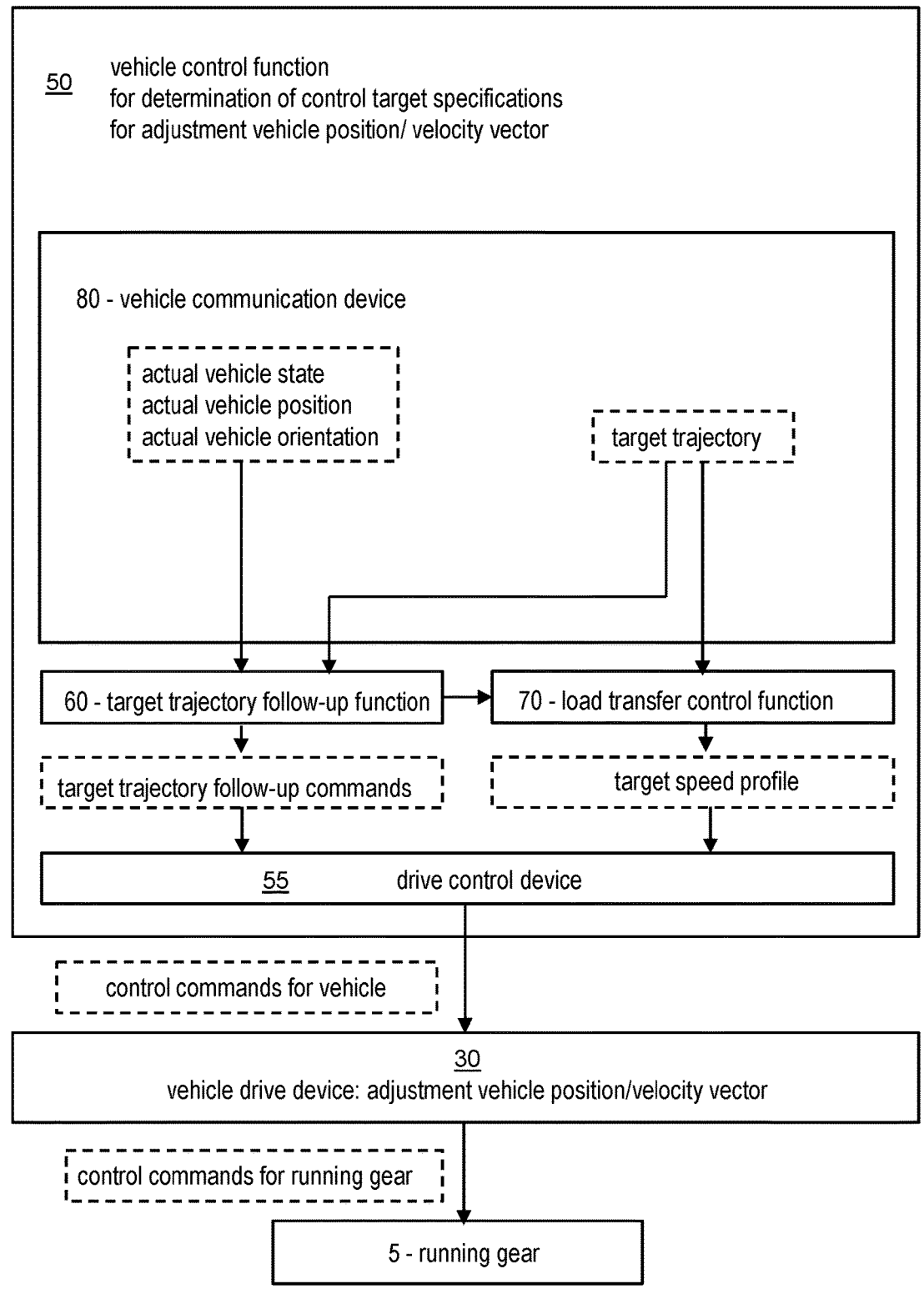
FIG. 6 shows a functional illustration of a further embodiment of the vehicle control function according to the invention with its functional integration into the vehicle.

FIG. 6 shows a further embodiment of the vehicle system S according to the invention with the vehicle control function 50, a drive control function 55 and a vehicle communication device 80. In this embodiment, it is provided that the vehicle communication device 80 receives current actual vehicle states and at least one target trajectory ST, for example in the form of data or a mathematical function. The respective current actual vehicle states can generally be determined by means of a sensor device and corresponding transformation of the sensor data into a coordinate system assigned to the operation surface E. The current actual vehicle states and the at least one target trajectory ST are transmitted to the target trajectory follow-up function 60. The target trajectory follow-up function 60 performs an assignment of current actual vehicle states and respective points of the target trajectory ST and determines target trajectory follow-up commands for respectively current actual vehicle states The target trajectory follow-up function 60 can be realized according to an embodiment described herein.

Furthermore, the vehicle communication device 80 sends the at least one target trajectory ST to the load transfer control function 70. The load transfer control function 70 can be realized according to an embodiment described herein. The load transfer control function 70 determines, for the respective target trajectory ST, in each case a target speed profile according to an embodiment described herein, in which at least in one of the target transfer points 211 a target acceleration of the vehicle 1 is defined in the section of the desired T-trajectory ST comprising the target T trajectory or in the transfer point 211, 311.

The target trajectory follow-up function 60 transmits the target trajectory follow-up commands to the drive control function 55 and the load transfer control function 70 transmits the target speed profile for the respective target trajectory ST or at least along the transfer region 215, 315 of the target trajectory ST, 200, 300 to the drive control function 55. These control target specifications are transmitted as current values in particular at predetermined time intervals and in particular at a predetermined iteration rate to the drive control function 55. The control target specifications can be transmitted to the drive control function 55 in a temporally consolidated manner, that is to say for the respective current point in time, in particular as a data packet or in a data structure. The drive control function 55 determines control commands from the target trajectory follow-up commands and the target speed profile, optionally with the respective target trajectory ST, and transmits them to the drive device 30. The control commands can include, for example, steering commands or direction change commands or acceleration commands. The control commands are suitable for the drive device 30 to convert them into running gear commands which are transmitted to the running gear 5 and which are suitable that the running gear 5 moves the vehicle 1 along the target trajectory ST and, in particular, along the transfer region 215, 315, and that in this process the transfer acceleration of the vehicle 1 to be achieved is realized at least in one of the target transfer points 211, 311.

As an alternative to the embodiment of FIG. 6, the target trajectory follow-up function 60 can be arranged in an external device, for example a logistics central device 300 arranged in a stationary manner in the operation area B, so that the target trajectory follow-up commands, optionally with the at least one target trajectory ST or respective target trajectories ST, is transmitted to the vehicle communication device 80 and received by the vehicle communication device 80 and transmitted to the drive control function 55. In this alternative, the vehicle control function 50 comprises the load transfer control function 70, which transmits the target speed profile for the respective target trajectory ST to the drive control function 55. The functionality of the drive control function 55 and the drive device 30 may be realized in accordance with an embodiment described herein with reference to FIG. 5 or FIG. 6.

As a further alternative to the embodiment of FIG. 6, the load transfer control function 70 may be integrated in an external device, e.g. a logistics central device 300 which is arranged stationary in the operation area B, so that the target speed profile is optionally with the at least one target trajectory ST or respective target trajectories ST can be transmitted to the vehicle communication device 80 and from the latter can be transmitted to the drive control function 55. In this alternative, the vehicle control function 50 comprises the target trajectory follow-up function 60 which transmits the target trajectory follow-up commands for the respective target trajectory ST to the drive control function 55.

In the embodiments described with reference to FIG. 6, it may alternatively or additionally be provided that the vehicle control function 50 has stored at least one target trajectory ST. For this purpose, it may alternatively or additionally be provided that the vehicle control function 50 comprises a target trajectory determination function which is designed according to a manner described herein and determines a respective target trajectory ST and transmits the same to the target trajectory follow-up function 60 and, if appropriate, the load transfer control function 70. Alternatively or additionally, it may also be provided that the load transfer control function 70 comprises a velocity determination function which is designed according to a manner described herein and determines the target speed profile for the respective target trajectory ST or at least along the transfer region 215, 315 of the target trajectory ST, 200, 300.

In the embodiments described with reference to FIG. 6, the transmission of the control target specifications and the embodiments thereof can be carried out, the functionality of the drive driving function 55 and the drive device 30 may be realized in accordance with an embodiment described herein with reference to FIG. 5 or FIG. 6.

According to a further aspect of the invention, a logistics system A is provided with a logistics system with a central device 300 and at least one vehicle system S. In an embodiment of the logistics system A shown in FIG. 7, the logistics central device 400 comprises a vehicle identification device 440 by means of which data are determined which define the respective current actual vehicle state, in particular the current actual vehicle position and optionally the current actual vehicle orientation in each case. Furthermore, the logistics central device 400 comprises a logistics communication device 480, which transmits the current actual vehicle state to the vehicle communication device 80 of the at least one vehicle system S. In this case, as shown, it can also be provided that at least one target trajectory ST is provided or stored in the logistics central device 400 and in this case, for example, in the logistics control function 450, and in that the at least one target trajectory ST is transmitted from the logistics communication device 480 to the respective vehicle system S. Alternatively or additionally, it can be provided that the logistics central device 400 or the logistics control function 450 comprises a target trajectory determination function which is designed according to one of the realizations described herein and determines at least one respective target trajectory ST and transmits the same to the target trajectory follow-up function 60 and, if appropriate, to the load transfer control function 70. For these realizations, it may alternatively or additionally be provided that at least one target trajectory ST is provided or stored in the vehicle control function 50 and/or that the vehicle control function 50 includes The target trajectory determination function, which is executed according to one of the realizations described herein, and determines at least one respective target trajectory ST and, if appropriate, load transfer control function 70 is transmitted.

Figure 7:
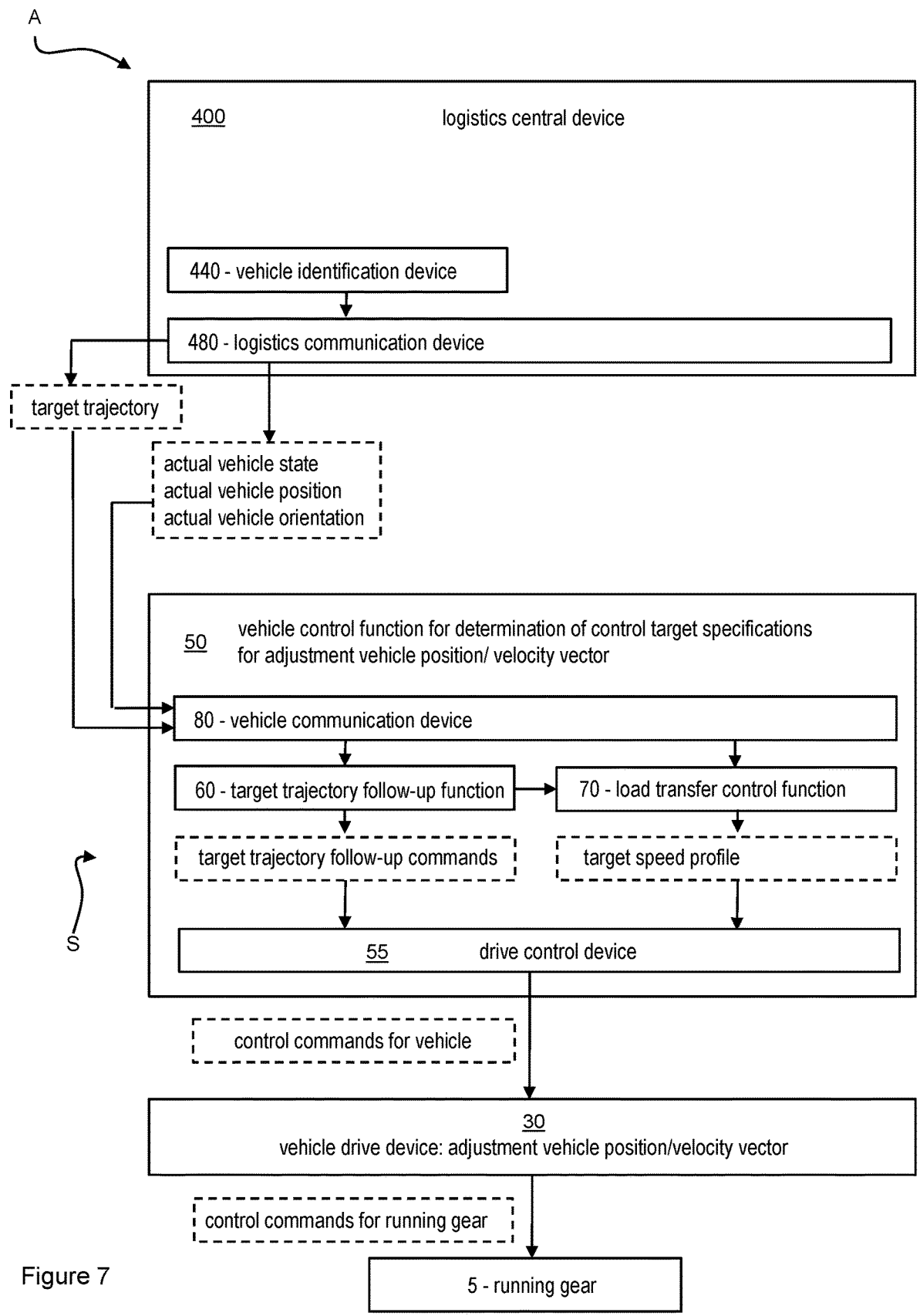
FIG. 7 shows a functional illustration of an embodiment of the logistics system according to the invention with an embodiment of the logistics central device and an embodiment of the vehicle control function with its functional integration in the vehicle.

In the embodiments described with reference to FIG. 7, the transmission of the control target specifications and the embodiments thereof, the functionality of the drive driving function 55 and the drive device 30 may be realized in accordance with an embodiment described herein with reference to FIG. 5 or FIG. 6.

In the embodiments described with reference to FIG. 7, the functionality of the drive control function 55 and of the drive device 30 may be realized according to an embodiment which is described herein with reference to FIG. 5 or FIG. 6.

Figure 8:
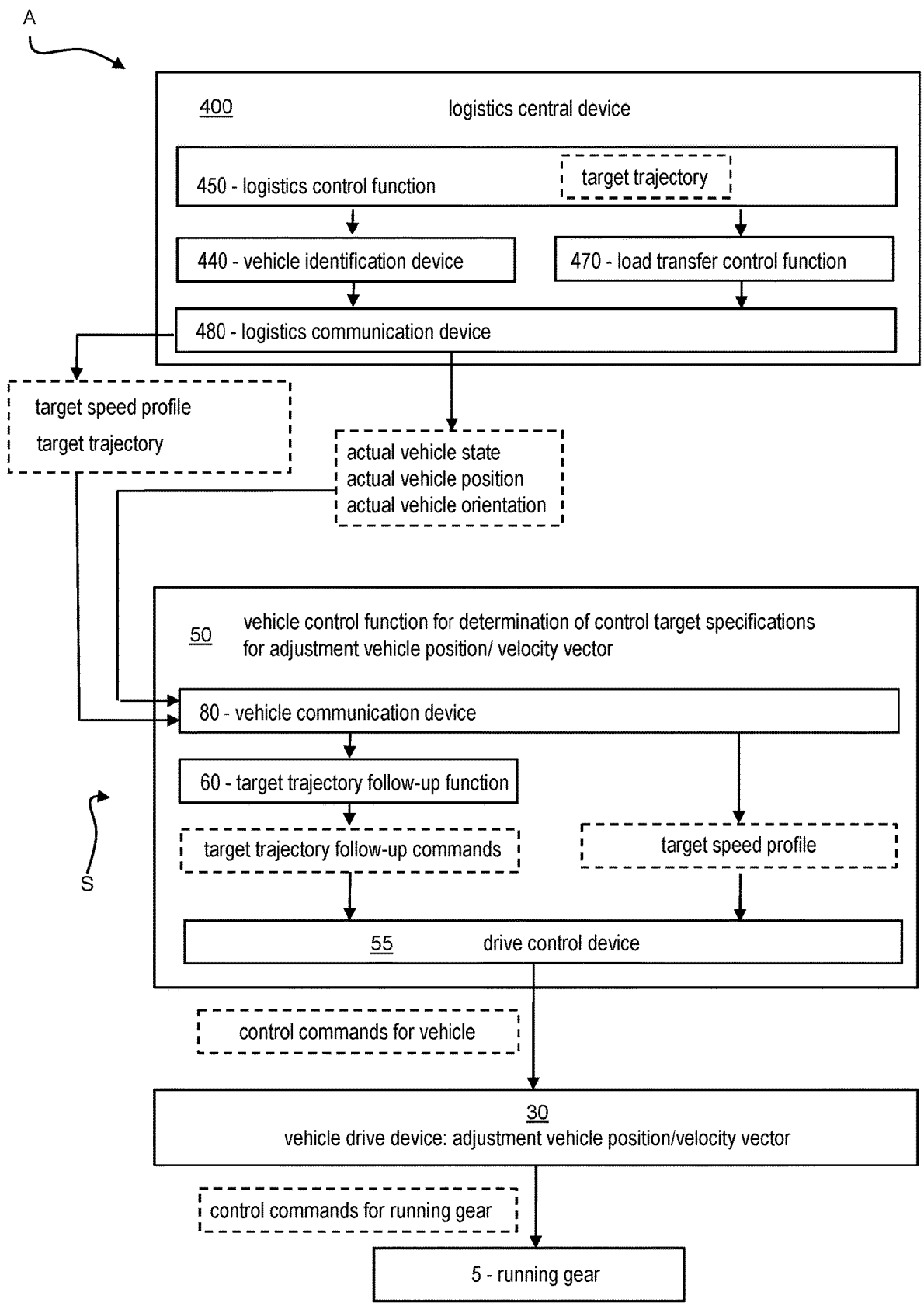
FIG. 8 shows a functional illustration of a further embodiment of the logistics system according to the invention with an embodiment of the logistics central device and an embodiment of the vehicle control function with its functional Integration in the vehicle.

In an embodiment of the logistics system A shown in FIG. 8, the logistics central device 400 comprises a vehicle identification device 440, which can be designed as described with reference to FIG. 7, a logistics control function 450 and a load transfer control function 470. The load transfer control function 470 may be realized according to a functionality generally described herein with respect to a load transfer control function. The logistics control function 450 provides at least one target trajectory ST. The logistics control function 450 is realized according to an embodiment which is described with reference to FIG. 7. The logistics central device 400 comprises a logistics communication device 480. The logistics control function 450 transmits at least one target trajectory ST to the logistics communication device 480. The load transfer control function 470 transmits a target speed profile for the respective target trajectory ST at least along the transfer region 215, 315 of the target trajectory ST, 200 300 according to an embodiment described herein. The target speed profile can in particular be designed in such a way that at least in a section of the target trajectory ST which comprises the target transfer point 211 or in the transfer point 211, 311 a target acceleration of the vehicle 1 is defined. The logistics communication device 480 transmits the current actual vehicle state, in particular the current actual vehicle position and optionally the current actual vehicle orientation in each case the at least one target trajectory ST and the target speed profile to the vehicle communication device 80.

The vehicle control function 50 comprises a target trajectory follow-up function 60, which receives at least one target trajectory ST and the respective current actual vehicle state from the vehicle communication device 80. The target trajectory follow-up function 60 can be realized in accordance with a functionality generally described herein with respect to a target trajectory follow-up function.

The target trajectory follow-up function 60 transmits the target trajectory follow-up commands to the drive control function 55. The vehicle communication device 80 transmits the target speed profile which can be realized in an embodiment described herein for the respective target trajectory ST to the drive control function 55. These control target specifications are transmitted as current values in particular at predetermined time intervals and in particular at a predetermined iteration rate to the drive control function 55. These control target specifications are transmitted as current values in particular at predetermined time intervals to the drive control function 55 at a predetermined iteration rate. In the embodiments described with reference to FIG. 7, the functionality of the drive control function 55 and of the drive device 30 can be realized according to an embodiment that is described herein with reference to FIG. 5 or FIG. 6.

Figure 9:
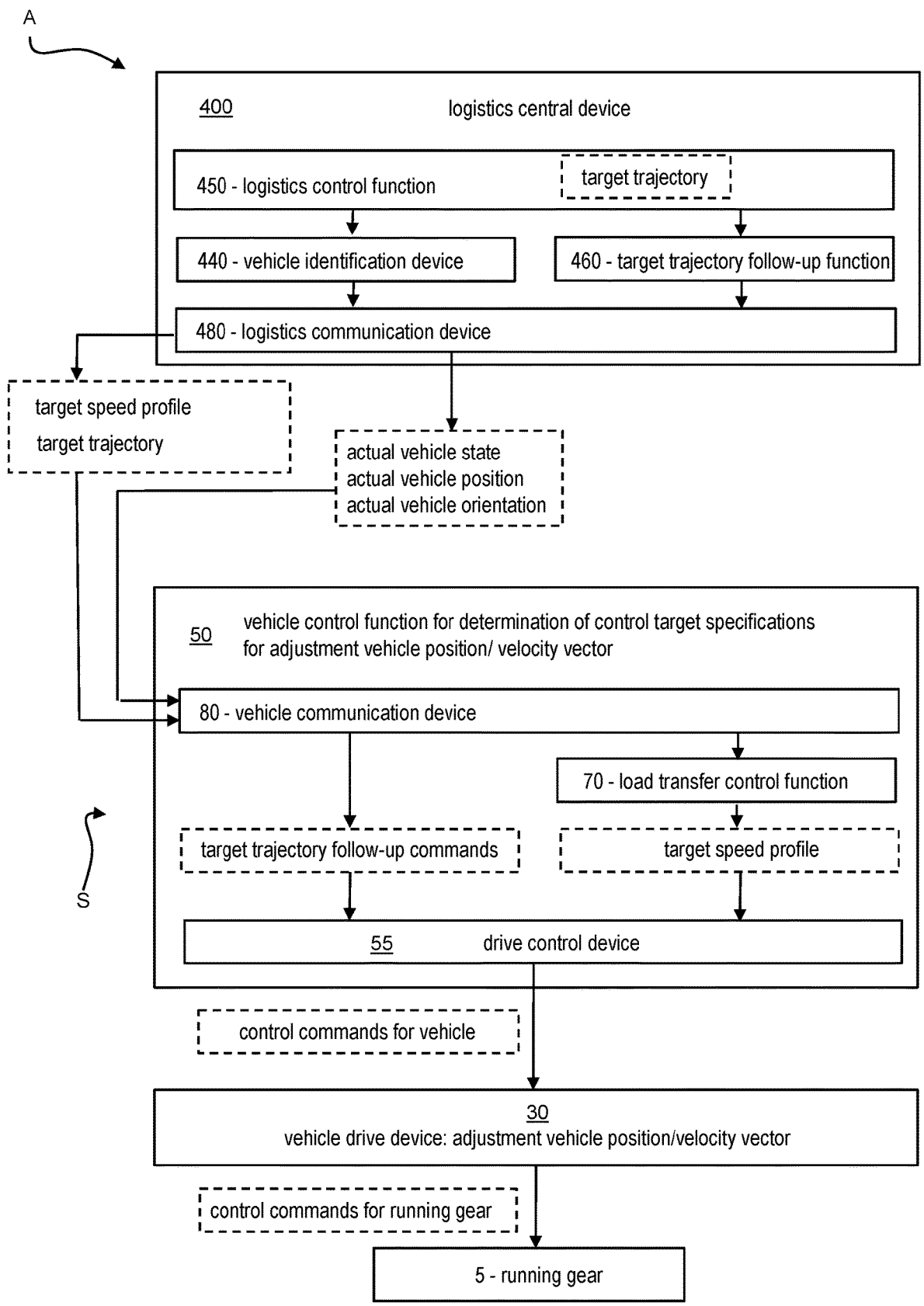
FIG. 9 shows a functional illustration of a further embodiment of the logistics system according to the invention with an embodiment of the logistics central device and an embodiment of the vehicle control function with its functional Integration in the vehicle.

In an embodiment of the logistics system A shown in FIG. 9, the logistics central device 400 comprises a vehicle identification device 440, which can be designed as described with reference to FIG. 7, a logistics control function 450 and a target trajectory follow-up function 460. The target trajectory tracking function 460 may be realized according to a functionality generally described herein with respect to a target trajectory follow-up function may be. The logistics control function 450 provides at least one target trajectory ST. The logistics control function 450 is realized according to an embodiment which is described with reference to FIG. 7. The logistics central device 400 comprises a logistics communication device 480. The logistics control function 450 transmits at least one target trajectory ST to the logistics communication device 480. The target trajectory follow-up function 460 takes an assignment of current actual vehicle states and respective points of the target trajectory ST and determines target trajectory follow-up commands for respectively current actual vehicle states. The target trajectory follow-up function 60 can be realized according to an embodiment described herein. The target trajectory follow-up function 60 determines target trajectory follow-up commands for the respective target trajectory ST and the respective current actual vehicle states according to an embodiment described herein and transmits the target trajectory follow-up commands to the logistics communication device 480. The logistics communication device 380 transmits the respective current target trajectory follow-up commands and optionally the at least one target trajectory ST to the vehicle communication device 80.

The vehicle control function 50 includes the load transfer control function 70. The vehicle communication device 80 transmits the at least one target trajectory ST to the load transfer control function 70 optionally the respective current actual vehicle states. The load transfer control function 70 May be realized according to a functionality generally described herein with respect to a load transfer control function. The load transfer control function 70 determines, for the respective target trajectory ST, in each case a target speed profile according to a specific embodiment described herein at least along the transfer region 215, 315 of the target trajectory ST, 200, 300, in which a target acceleration of the vehicle 1 is defined at least in a section of the target trajectory ST comprising the target transfer point 211, 311 or at the transfer point 211, 311. The load transfer control function 70 transmits a target speed profile for the respective target trajectory ST to the drive control function 55 as control target specifications according to an embodiment described herein. The vehicle communication device 80 transmits target trajectory follow-up commands for the respective target trajectory ST and the respective current actual vehicle states as control target specifications according to an embodiment described herein to the drive control function 55.

These control target specifications are transmitted as current values in particular at predetermined time intervals and in particular at a predetermined iteration rate to the drive control function 55. In the embodiments described with reference to FIG. 7, the functionality of the drive control function 55 and of the drive device 30 can be realized according to an embodiment which is described herein with reference to FIG. 5 or FIG. 6.

Figure 10:
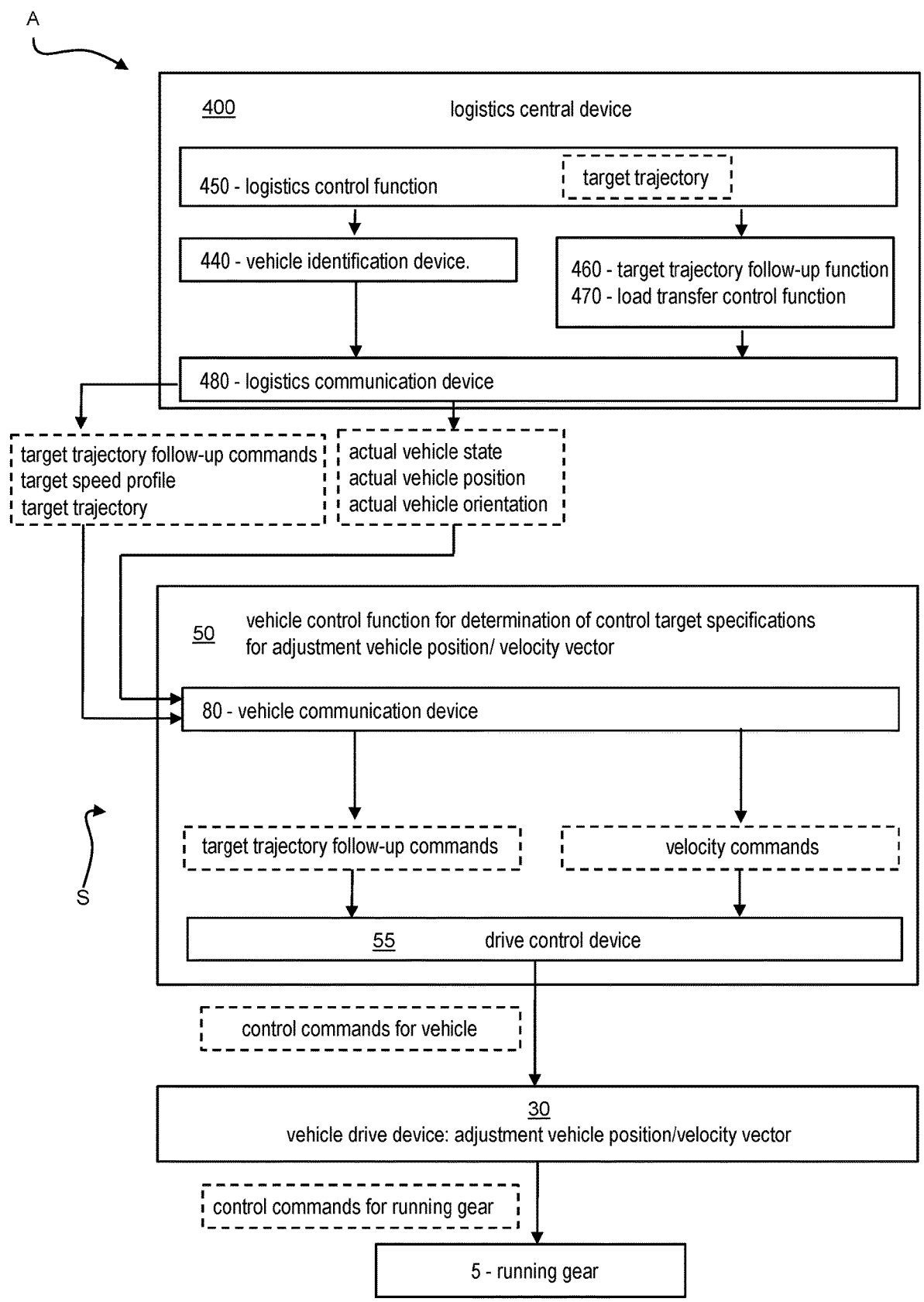
FIG. 10 shows a functional illustration of a further embodiment of the logistics system according to the invention with an embodiment of the logistics central device and an embodiment of the vehicle control function with its functional Integration in the vehicle.

In an embodiment of the logistics system A shown in FIG. 10, the logistics central device 400 comprises a vehicle identification device 440, which can be designed as described with reference to FIG. 7 a logistics control function 450, a target trajectory follow-up function 460 and a load transfer control function 470. The target trajectory follow-up function 460 can be realized in accordance with a functionality generally described herein with respect to a target trajectory follow-up function. The load transfer control function 470 may be realized according to a functionality generally described herein with respect to a load transfer control function. The logistics control function 450 provides at least one target trajectory ST. The logistics control function 450 is realized according to an embodiment which is described with reference to FIG. 7. The logistics central device 400 comprises a logistics communication device 480. Optionally, the logistics control function 450 transmits the at least one target trajectory ST to the logistics communication device 480. The target trajectory follow-up function 460 performs an assignment of current actual vehicle states and respective points of the target trajectory ST and determines target trajectory follow-up commands for respectively current actual vehicle states. The target trajectory follow-up function 60 determines target trajectory follow-up commands for the respective target trajectory ST and the respective current actual vehicle states according to an embodiment described herein and transmits the target trajectory follow-up commands and optionally the at least one target trajectory ST to the logistics communication device 480. The load transfer control function 470 transmits a target speed profile at least along the transfer region 215 for the respective target trajectory ST 315 of the target trajectory ST, 200, 300 according to an embodiment described herein. The target speed profile may in particular be designed in such a way that at least in one of the target transfer points 211 a target acceleration of the vehicle 1 is defined in the section of the target trajectory ST having the target trajectory ST or at the transfer point 211, 311. The logistics communication device 480 transmits the respective current target trajectory follow-up commands, optionally the respective current actual vehicle state optionally the at least one target trajectory ST and the target speed profile to the vehicle communication device 80.

The vehicle control function 50 may be realized according to an embodiment described with reference to FIG. 6. These control target values are determined as current values in particular at predetermined time intervals and in particular is transmitted to the drive control function 55 at a predetermined iteration rate. In the embodiments described with reference to FIG. 10, the functionality of the drive driving function 55 and the drive device 30 may be realized according to an embodiment that is described herein with reference to FIG. 5 or FIG. 6.

Each specified trajectory follow-up function 60 mentioned herein can be a functional component of a trajectory control function of a logistics central device 400, which is arranged in a stationary manner in the operation area.

According to a further aspect of the invention, a method for transferring a unit load L from a vehicle 1 to a unit load receiving device is provided in an operation area. In particular, the vehicle 1 comprises: the running gear 5, the drive device 30, which is connected to the running gear 5 and which adjusts a velocity vector of the vehicle 1 on the operation surface of the operation area and the vehicle frame 10 arranged on the running gear 5 with a receiving component 7 for receiving a unit load L. The method according to the invention comprises the following steps:

based on control target specifications, determination of control commands and transmission thereof to the drive device 30 in order to set a respective current velocity vector of the vehicle 1, upon movement of the vehicle with the respective velocity vector, determining a deviation relation between current vehicle actual states at least with a vehicle actual position relative to a target trajectory in each case, wherein the target trajectory runs between an initial point and an end point and comprises a transfer region with a target transfer point assigned to the unit load receiving device, from the deviation relation, determining target trajectory follow-up commands and transmitting the same as control commands to the drive device. wherein the vehicle is moved along the target trajectory with the control commands on a vehicle movement path, on the basis of a target speed profile of the vehicle, in particular on the basis of an activation of the target trajectory follow-up function, determination of velocity commands which can be carried out by means of a load transfer control function described herein, and transmitting the same as control commands to the drive device, wherein the velocity commands adjust a transfer velocity of the vehicle in the target transfer point and the unit load L located on the receiving component of the vehicle changes, as a result of the mass inertia thereof, is moved onto the unit load receiving device.

The determination of target trajectory follow-up commands from the deviation relation and the transmission of the same as control commands to the drive device can take place with a target trajectory follow-up function described herein.

The determination of velocity commands on the basis of a target speed profile of the vehicle can take place with a load transfer control function described herein and can in particular be carried out on the basis of an activation of the target trajectory follow-up function.

In general, it can be provided that the control target specifications, at any relevant point in time, are set in relation to the current state of the vehicle 1 of the respective point in time and in particular each calculation time of the vehicle system S, and in this case the target states of the vehicle 1 are optionally compared with current states of the vehicle 1 in order to determine control commands for the drive device 30 in each case therefrom. The control commands are determined in such a way that the current state of the vehicle 1 of the respective time point changes into the target state relevant for the respective point in time. The control commands for the respective point in time can be determined, in particular, using known control methods or an estimation method.

What is claimed is:

1. A vehicle for transferring a unit load to a unit load receiving device in an operation area, the vehicle comprising: a running gear, a drive device which is connected to the running gear and drives the running gear on the basis of control commands for adjusting a velocity vector of the vehicle, and a vehicle frame arranged on the running gear and comprising a receiving component for receiving the unit load, wherein the vehicle comprises a vehicle system with a vehicle control function, wherein the vehicle control function uses or determines target trajectory follow-up commands as control target specifications with which the vehicle is moved on a vehicle movement path along a target trajectory, wherein the target trajectory runs between an initial point (201, 301) and an end point and comprises a transfer region with a target transfer point associated with the unit load receiving device, wherein the vehicle control function uses or determines, at least for the transfer region of the target trajectory, a target speed profile as control target specification, wherein the vehicle control function comprises a drive control function which converts the control target specifications into control commands which define a respective current target velocity vector with respect to the respective actual vehicle state, wherein the drive device, on the basis of the control commands, realizes a transfer acceleration of the vehicle at least in a section comprising the target transfer point in which the unit load located on the receiving component of the vehicle is moved by its mass inertia onto the unit load receiving device.

2. The vehicle according to claim 1, wherein the vehicle control function comprises a target trajectory follow-up function which, when the vehicle is moved, puts current vehicle actual states at least with a vehicle actual position relative to a target trajectory into a deviation relation and determines target trajectory follow-up commands from the deviation relation and transmits them as control commands to the drive control function.

3. The vehicle according to claim 1, wherein the vehicle control function comprises a load transfer control function which determines velocity commands on the basis of a target speed profile of the vehicle and transmits the same as control commands to the drive control function which sets a transfer velocity of the vehicle in the target transfer point, wherein the shape of the transfer region, the position of the transfer point relative to the unit load receiving device and the transfer velocity are set in such a way that the unit load located on the receiving component of the vehicle is moved by its mass inertia onto the unit load receiving device.

4. The vehicle according to claim 3, wherein the load transfer control function defines a target velocity of the vehicle in the target transfer point.

5. The vehicle according to claim 3, wherein the load transfer control function defines a target acceleration of the vehicle in the transfer region.

6. The vehicle according to claim 3, wherein a target speed profile is predetermined in the load transfer control function.

7. The vehicle according to claim 1, wherein a velocity determination function determines the target speed profile on the basis of one or both of the profiles (ST1), (ST2) of the transfer region:

(ST1) the transfer area guides the vehicle past the unit load receiving device and comprises a curvature section with substantially uniform curvature so that the vehicle experiences a lateral acceleration, wherein the unit load receiving device is located on the convex side thereof, (ST2) the transfer region guides the vehicle to an impact against the unit load receiving device in the target transfer point with a movement direction reversal in this target transfer point.

8. The vehicle according to claim 7, wherein the velocity determination function determines a value for the target acceleration in the transfer point and determines therefrom the target speed profile.

9. The vehicle according to claim 1, wherein the target trajectory in the vehicle control function is stored as a predetermined target trajectory and the vehicle control function is the target trajectory of the provides a target trajectory follow-up function.

10. The vehicle according to claim 1, wherein the vehicle control function comprises a target trajectory determination function which determines the target trajectory and the vehicle control function provides the target trajectory to the target trajectory follow-up function.

11. The vehicle according to claim 1,
wherein the vehicle control function comprises a target trajectory determination function which determines the target trajectory and the vehicle control function provides the target trajectory to the target trajectory follow-up function, wherein the target trajectory determination function has stored a plurality of target trajectories and the target trajectory determination function is determined on the basis of at least one trajectory course criterion selecting one of the target trajectories or the target trajectory determination function, based on at least one trajectory course criterion, adapts parameters of the target trajectory according to the trajectory course criterion, wherein the stored target trajectories are defined according to one of the two following alternatives (ST1), (ST2):

(ST1) the transfer area guides the vehicle past the unit load receiving device and comprises a curvature section with uniform curvature so that the vehicle experiences lateral acceleration, wherein the unit load receiving device is located on the convex side thereof, (ST2) the transfer region guides the vehicle to an impact against the unit load receiving device in the target transfer point with a movement direction reversal in this target transfer point.

12. The vehicle according to claim 1, wherein the vehicle control function comprises a target trajectory determination function which determines the target trajectory and the vehicle control function (50) provides the target trajectory to the target trajectory follow-up function, wherein the target trajectory determination function uses, in the case of a target speed profile defined as a control target specification in the transfer region and/or in the case of an target acceleration defined as target transfer point of the vehicle, one or more of the following trajectory course criteria (TK1), (TK2), (TK3), (TK4), (TK5), (TK6) to achieve the transfer acceleration to be achieved to ensure vehicle 1:

(TK1) minimum length from the vehicle actual position or the initial point of the target trajectory to the target transfer point, (TK2) minimum transfer velocity, (TK3) minimum time duration from the vehicle actual position or the initial point of the target trajectory to the target transfer point, (TK4) minimal energy demand or minimum energy consumption for driving the vehicle from the vehicle actual position or the initial point of the target trajectory to the target transfer point, (TK5) reliable/process-safe transfer or no malfunction of the unit load L from the vehicle to the unit load receiving device, (TK6) minimal utilization of space in the unit load receiving device.

13. The vehicle according to claim 1, wherein the vehicle system comprises a vehicle communication device which can be brought in data or signal connection with a logistics central device arranged in a stationary manner in the operation area and receives one or both of the following data (D1), (D2):

(D1) control target specifications from the logistics central device and vehicle control function, (D2) data, which define a current vehicle state at least with a vehicle-actual position, and transmits to the vehicle control function.

14. The vehicle according to claim 1, wherein the vehicle system comprises a sensor device which captures current vehicle actual positions, which is operatively connected to the vehicle control function and transmits the current vehicle actual positions to the vehicle control function.

15. The vehicle according to claim 1, wherein the vehicle system comprises a sensor device which captures current vehicle actual positions, which is operatively connected to the vehicle control function and transmits the current vehicle actual positions to the vehicle control function, wherein the sensor device comprises an optical sensor or a camera, which respectively images optical floor features or floor markings of the operation surface that can be captured by the optical sensor, wherein the vehicle system comprises an identification function with which the vehicle actual position is determined on the basis of a current mapping of ground features or floor markings which are arranged on the operation surface.

16. A logistics system comprising:

a logistics central device which is arranged in a stationary manner in an operation area and comprises a logistics communication device, a unit load receiving device arranged in the operation area, a vehicle for transferring a unit load to the unit load receiving device, the vehicle which comprising: a running gear, a drive device, which is in communication with the running gear (5) and which adjusts a velocity vector of the vehicle on an operation surface of the operation area, and a vehicle frame which is arranged on the running gear and comprises a receiving component for receiving the unit load, wherein the vehicle comprises a vehicle system which comprises:

a vehicle control function which is functionally connected to the drive device and which determines control commands on the basis of control target specifications and transmits said commands to the drive device for adjusting a respective current velocity vector of the vehicle, a vehicle communication device which is in data or signal connection with the logistics communication device via radio and is functionally connected to the vehicle control function, wherein the vehicle control function uses or determines target trajectory follow-up commands as control target specifications with which the vehicle is moved along a target trajectory on a vehicle movement path, wherein the target trajectory runs between an initial point and an end point and comprises a transfer region with a target transfer point assigned to the unit load receiving device, wherein the vehicle control function uses or determines a target speed profile as control target specification at least for the transfer region of the target trajectory, wherein the vehicle control function comprises a drive control function which converts the control target specifications into control commands which define a respective current target velocity vector with respect to the respective current vehicle state, wherein the drive device, on the basis of the control commands, realizes a transfer acceleration of the vehicle at least in a section comprising the target transfer point in which transfer acceleration the unit load located on the receiving component of the vehicle is moved by its mass inertia onto the unit load receiving device.

17. The logistics system according to claim 16, wherein the logistics central device comprises a vehicle identification device for determination of respective current vehicle actual positions, wherein the vehicle identification device is functionally connected to the logistics communication device and transmits the determined respective current vehicle actual positions to the logistics communication device, wherein the logistics communication device is connected to the vehicle communication device via a radio connection and transmits the respective current vehicle actual positions to the vehicle communication device, wherein the vehicle control function is operatively connected to the vehicle communication device and receives the current actual vehicle positions, respectively, wherein the vehicle control function comprises a target trajectory follow-up function (60) which, on the basis of the received respective current vehicle actual positions and on the basis of the target trajectory, determines target trajectory follow-up commands and transmits control commands to the drive device, wherein the vehicle control function comprises a load transfer control function which generates velocity commands on the basis of a target speed profile of the vehicle and transmits the velocity commands as control commands to the drive device.

18. The logistics system according to claim 16, wherein the logistics central device comprises:

a logistics identification device for determining respective current vehicle actual positions, a target trajectory follow-up function with the target trajectory which, on the basis of the current vehicle actual positions and the target trajectory, determines target trajectory follow-up commands and transmits the same as control target specifications to the logistics communication device, which transmits the target trajectory follow-up commands to the vehicle communication device as control target specifications, a load transfer control function that generates velocity commands and transmits the same as control target specifications to the logistics communication device which determines the velocity commands and transmits the same as control target specifications to the vehicle communication device, wherein the vehicle communication device transmits the target trajectory follow-up commands as control target specifications to the vehicle control function which transmits the target trajectory follow-up commands and the velocity commands to the drive device.

19. The logistics system according to claim 16, wherein the logistics central device comprises: a logistics identification device for determining in each case current vehicle actual positions, a central target trajectory follow-up function which, on the basis of the current vehicle actual positions and the target trajectory, determines target trajectory follow-up commands and transmits them as control target specifications to the logistics communication device which transmits the target trajectory follow-up commands to the vehicle communication device, wherein the vehicle communication device transmits the target trajectory follow-up commands as control commands to the drive device, wherein the vehicle control function comprises: the load transfer control function that generates velocity commands based on a target speed profile of the vehicle and acts as control commands to the drive device.

20. A method for transferring a unit load from a vehicle to a unit load receiving device in an operation area, the vehicle comprising: a running gear, a drive device which is connected to the running gear and which, on the basis of control commands, adjusts a velocity vector of the vehicle on an operation surface of the operation area, and a vehicle frame arranged on the running gear and comprising a receiving component for receiving a unit load, wherein the method comprises the following steps:

upon movement of the vehicle with a respective velocity vector, determining a deviation relation between respective current vehicle actual states at least with a respective current vehicle actual position relative to a target trajectory, wherein the target trajectory runs between an initial point and an end point and comprises a transfer region with a target transfer point associated with the unit load receiving device, from the deviation relation determining target trajectory follow-up commands and transmission of the same as control commands to the drive device, wherein by means of the control commands a respective current velocity vector of the vehicle is adjusted and the vehicle is moved on a vehicle movement path along the target trajectory, based on a target speed profile of the vehicle, determining velocity commands and transmitting the same as control commands to the drive device, wherein the velocity commands adjust a transfer acceleration of the vehicle in the target transfer point and wherein the unit load which is located on the receiving component of the vehicle is moved by the mass inertia thereof to the unit load receiving device.

21. The method according to claim 20, wherein a speed profile for the vehicle is predefined when driving along the target trajectory.

22. The method according to claim 20, wherein the transfer acceleration is determined on the basis of one or both of the profiles (ST1), (ST2) of the transfer region:

(ST1) the transfer area guides the vehicle past the unit load receiving device and comprises a curvature section with substantially uniform curvature so that the vehicle realizes a lateral acceleration wherein the unit load receiving device is located on the convex side thereof is located, (ST2) the transfer region guides the vehicle to an impact against the unit load receiving device in the target transfer point with a movement direction reversal in this target transfer point.

23. The method according to one of claim 20, wherein the target trajectory is a predefined target trajectory or wherein the vehicle control function comprises a target trajectory determination function which determines the target trajectory and the vehicle control function provides the target trajectory of the target trajectory follow-up function.

24. The method according to claim 20, wherein target trajectories are defined according to one of the two following alternatives (ST1), (ST2):

(ST1) the transfer area guides the vehicle past the unit load receiving device and comprises a curvature section with uniform curvature so that the vehicle realizes a lateral acceleration, wherein the unit load receiving device is located on the convex side thereof, (ST2) the transfer region guides the vehicle to an impact against the unit load receiving device in the target transfer point with a movement direction reversal in this target transfer point.

25. The method according to claim 20, wherein the vehicle control function comprises a target trajectory determination function which determines the target trajectory and the vehicle control function provides the target trajectory of the target trajectory follow-up function, wherein the target trajectory determination function in the case of a target speed profile defined as a control target specification in the transfer region and/or in the case of a target acceleration defined as a control target specification in the target transfer point of the vehicle, one or more of the following trajectory course criteria (TK1), (TK2), (TK3), (TK4), (TK5), (TK6) to ensure the transfer acceleration of the vehicle 1 to be achieved:

(TK1) minimum length from the vehicle current position or the initial point of the target trajectory to the target transfer point, (TK2) minimum transfer velocity, (TK3) minimum time duration from the vehicle current position or the initial point of the target trajectory to the target transfer point, (TK4) minimal energy demand or minimum energy consumption for driving the vehicle from the vehicle actual position or the initial point of the target trajectory ST to the target transfer point (TK5) reliable/process-safe transfer or no malfunction of the unit load L from the vehicle to the unit load receiving device, (TK6) minimal utilization of space in the unit load receiving device.

26. The method according to claim 20, wherein the target trajectory is formed from a load transfer trajectory and a coupling trajectory connected thereto, wherein the load transfer trajectory runs between an initial point and a target transfer point associated with the unit load receiving device, and the coupling trajectory guides to the coupling point and connects the current vehicle actual position to the coupling point, wherein the target trajectory follow-up commands are determined with the following functions:

(i) a coupling trajectory follow-up function, which, when the vehicle is moved, puts current actual vehicle positions and the coupling trajectory into a deviation relation and determines coupling trajectory control commands from the deviation relation and transmits the same to the drive device such that the vehicle is moved on a vehicle trajectory along the coupling trajectory, (ii) a load transfer trajectory follow-up function which, after the vehicle has reached the load transfer trajectory, puts current vehicle actual positions and the load transfer trajectory in a deviation relation and determines from the deviation relation load transfer trajectory control commands and transmits the same to the drive device so that the vehicle is moved on a vehicle trajectory along the load transfer trajectory.

* * * * *